(12) United States Patent
Stricklen et al.

(10) Patent No.: US 10,034,259 B2
(45) Date of Patent: *Jul. 24, 2018

(54) MOBILE DEVICE MANAGEMENT

(71) Applicant: CA, Inc., New York, NY (US)

(72) Inventors: Michael Stricklen, Manchester, NH (US); Thomas McHale, Reston, VA (US); Marc Caminetsky, Newton, MA (US); Venkat Reddy Pagadala, Hyderabad (IN)

(73) Assignee: CA, Inc., New York, NY (US)

(*) Notice: Subject to any disclaimer, the term of this patent is extended or adjusted under 35 U.S.C. 154(b) by 69 days.

This patent is subject to a terminal disclaimer.

(21) Appl. No.: 14/556,829

(22) Filed: Dec. 1, 2014

(65) Prior Publication Data
US 2015/0133087 A1 May 14, 2015

Related U.S. Application Data

(62) Division of application No. 11/841,256, filed on Aug. 20, 2007, now Pat. No. 8,903,365.

(Continued)

(51) Int. Cl.
*H04W 8/20* (2009.01)
*H04W 60/00* (2009.01)
(Continued)

(52) U.S. Cl.
CPC ........ *H04W 60/00* (2013.01); *H04L 67/125* (2013.01); *H04W 8/20* (2013.01); *H04W 8/22* (2013.01); *H04W 12/06* (2013.01); *H04W 24/00* (2013.01)

(58) Field of Classification Search
CPC ....... H04L 63/20; H04L 63/102; H04W 12/08
(Continued)

(56) References Cited

U.S. PATENT DOCUMENTS

| 5,214,789 A | 5/1993 | George |
| 6,018,652 A | 1/2000 | Frager |

(Continued)

FOREIGN PATENT DOCUMENTS

| WO | WO 03/019907 | 3/2003 |
| WO | WO 2004/015930 | 2/2004 |
| WO | WO 01/01714 | 1/2007 |

*Primary Examiner* — Dung Hong
(74) *Attorney, Agent, or Firm* — Pillsbury Winthrop Shaw Pittman LLP

(57) ABSTRACT

The invention provides systems and methods for managing mobile devices of supported by different platforms. In some embodiments, the invention provides this management capability by utilizing one or more agents or modules native to the platforms themselves to provide interaction with individual mobile. In some embodiments, the invention provides an abstraction layer by which management tasks or other functions relating to mobile devices of different types may be generally defined and translated for application to mobile devices supported by different platforms. In some embodiments, the invention utilizes existing organizational structure of an enterprise or organization to define management permission for mobile device administrators and end users as well as to define policy configuration schemes for mobile devices. In some embodiments, the invention tracks the lifecycle of mobile devices within an enterprise or organization as assets within the organization.

19 Claims, 7 Drawing Sheets

Related U.S. Application Data

(60) Provisional application No. 60/838,366, filed on Aug. 18, 2006.

(51) Int. Cl.
  *H04W 8/22* (2009.01)
  *H04L 29/08* (2006.01)
  *H04W 12/06* (2009.01)
  *H04W 24/00* (2009.01)

(58) Field of Classification Search
  USPC .............. 455/418–420, 414.2, 456.1, 456.6
  See application file for complete search history.

(56) References Cited

U.S. PATENT DOCUMENTS

| | | |
|---|---|---|
| 6,212,391 B1 | 4/2001 | Saleh |
| 6,338,082 B1 | 1/2002 | Schneider |
| 6,571,096 B2 | 5/2003 | Plunkett |
| 6,601,086 B1 * | 7/2003 | Howard .................... G06F 8/65 707/999.01 |
| 6,678,717 B1 | 1/2004 | Schneider |
| 6,714,987 B1 | 3/2004 | Amin |
| 6,775,536 B1 | 8/2004 | Geiger |
| 6,834,341 B1 | 12/2004 | Bahl |
| 6,867,683 B2 | 3/2005 | Calvesio |
| 6,885,859 B2 | 4/2005 | Karaoguz |
| 7,142,108 B2 | 11/2006 | Diener |
| 7,469,139 B2 | 12/2008 | van de Groenendaal |
| 7,787,863 B2 | 8/2010 | van de Groenendaal |
| 8,095,115 B2 | 1/2012 | Van de Groenendaal |
| 8,180,328 B2 | 5/2012 | Van de Groenendaal |
| 2001/0027378 A1 * | 10/2001 | Tennison .............. G01M 17/00 701/482 |
| 2002/0007407 A1 | 1/2002 | Klein |
| 2002/0157024 A1 | 10/2002 | Yokote |
| 2002/0164997 A1 | 11/2002 | Parry |
| 2002/0173316 A1 | 11/2002 | Jang |
| 2003/0008662 A1 * | 1/2003 | Stern ................. H04M 1/72572 455/456.1 |
| 2003/0083043 A1 | 5/2003 | Grego |
| 2003/0134637 A1 | 7/2003 | Cooper |
| 2003/0204748 A1 | 10/2003 | Chiu |
| 2003/0225893 A1 | 12/2003 | Roese |
| 2003/0233580 A1 | 12/2003 | Keeler |
| 2004/0009778 A1 | 1/2004 | Makuta |
| 2004/0068571 A1 | 4/2004 | Ahmavaara |
| 2004/0098715 A1 | 5/2004 | Aghera |
| 2004/0103282 A1 | 5/2004 | Meier |
| 2004/0198319 A1 | 10/2004 | Whelan |
| 2004/0221155 A1 | 11/2004 | Venkatachary |
| 2004/0221157 A1 | 11/2004 | Venkatachary |
| 2004/0224682 A1 | 11/2004 | Kang |
| 2004/0267670 A1 * | 12/2004 | Minyailov .......... G06F 21/6218 705/51 |
| 2005/0022001 A1 | 1/2005 | Bahl |
| 2005/0050318 A1 | 3/2005 | Alone |
| 2005/0066200 A1 | 3/2005 | Bahl |
| 2005/0071498 A1 | 3/2005 | Farchmin |
| 2005/0124332 A1 | 6/2005 | Clark |
| 2005/0134696 A1 | 6/2005 | Nath |
| 2006/0105810 A1 | 5/2006 | Gnuschke |
| 2006/0217113 A1 * | 9/2006 | Rao ..................... H04L 41/0233 455/422.1 |
| 2006/0236363 A1 * | 10/2006 | Heard .................. H04L 63/101 726/1 |
| 2007/0143824 A1 | 6/2007 | Shahbazi |
| 2007/0169073 A1 | 7/2007 | O'Neill |
| 2009/0131020 A1 | 5/2009 | Van de Groenendaal |
| 2010/0064341 A1 * | 3/2010 | Aldera ................. H04L 63/102 726/1 |
| 2012/0079567 A1 | 3/2012 | Van de Groenendaal |

* cited by examiner

MOBILE DEVICE MANAGEMENT

This application is a division of U.S. patent application Ser. No. 11/841,256, filed Aug. 20, 2007, which claims the benefit of U.S. Provisional Patent Application No. 60/838,366, filed Aug. 18, 2006, each of the foregoing application is hereby incorporated herein by reference in its entirety.

FIELD

The invention relates to systems and methods for management of a plurality of mobile devices of varying platforms though a single management application.

BACKGROUND

Businesses, enterprises, or other organizations often employ multiple persons that utilize one or more wireless, computer-implemented mobile devices to perform at least a modicum of work-related tasks. Accordingly, these enterprises are faced with a myriad of management challenges relating to these mobile devices such as, for example, data and network security, software updates, reliability of communication channels, and other challenges. Furthermore, in many instances, the mobile devices utilized by employees or associates of an organization vary in their type, supporting platform, or vary in other ways. This presents even further challenges to an enterprise attempting to manage a plurality of mobile devices.

Still more challenges may be posed by the multitude of variations that take place in an organization in relation to the mobile devices of employees or associates. For example, within an enterprise or organization, users and devices may be added, deleted and changed. Users may leave an enterprise, move within the enterprise, change roles or responsibilities, and/or be given different mobile devices. This variation may cause changes in geographic locations, telephone numbers, devices, policy changes, service providers and/or service provider plans. Furthermore, devices can be lost, destroyed, reassigned or removed from operation. As such, management of the multitude of variation within and among mobile devices of an enterprise or organization may, inter alia, tax resources, present security risks, and/or pose other problems.

Other challenges also exist.

BRIEF SUMMARY

The invention provides enterprises or other organizations with an enterprise level device management tool for various mobile device platforms (e.g., Microsoft™, Symbian™, and RIM™). The invention provides management over-the-air (OTA), with security that utilizes, where practical, Open Mobile Alliance (OMA) Device Management (DM) standards components. The invention enables device-independent consolidated asset inventory, configuration management, policy compliance, and security management through a single management application.

In some embodiments, the invention provides systems and methods for managing mobile devices of supported by different platforms by utilizing one or more agents or modules native to the platforms themselves to provide interaction with individual mobile devices. In some embodiments, the invention provides an abstraction layer by which management tasks or other functions relating to mobile devices of different types may be generally defined and translated for application to mobile devices supported by different platforms. In some embodiments, the invention utilizes existing organizational structure (e.g., an enterprise directory) of an enterprise or organization to define management permissions for mobile device administrators and end users as well as to define policy configuration schemes for mobile devices or for other purposes. In some embodiments, the invention tracks the lifecycle of mobile devices within an enterprise or organization as assets within the organization. As used herein the term "enterprise" may refer to any business entity, educational entity, non-profit organization, governmental or quasi-governmental organization, or other organization.

These and other objects, features, and advantages of the invention will be apparent from the detailed description and the attached drawings. It is understood that both the foregoing summary and the following detailed description are for exemplification of features of the invention and are not restrictive as to the scope of the invention.

DETAILED DESCRIPTION

The invention provides systems and methods for providing enterprise-level management of mobile devices supported by various mobile platforms. In some embodiments, the invention provides this management capability by utilizing one or more agents or modules native to and/or specific to the platforms themselves to facilitate interaction with individual mobile devices. In some embodiments, the invention provides an abstraction layer by which management tasks or other functions relating to mobile devices of different types may be generally defined and translated for application to mobile devices supported by varying platforms. In some embodiments, the invention may utilize the existing organizational structure (e.g., an enterprise directory) of an enterprise or organization to define management permissions for mobile device administrators and end users as well as to define policy configuration schemes for mobile devices, or for other purposes. In some embodiments, the invention tracks the lifecycle of mobile devices within an enterprise or organization as assets within the organization. As used herein the term "enterprise" may refer to any, business entity, educational entity, non-profit organization, governmental or quasi-governmental organization, or other organization.

Figure 1:
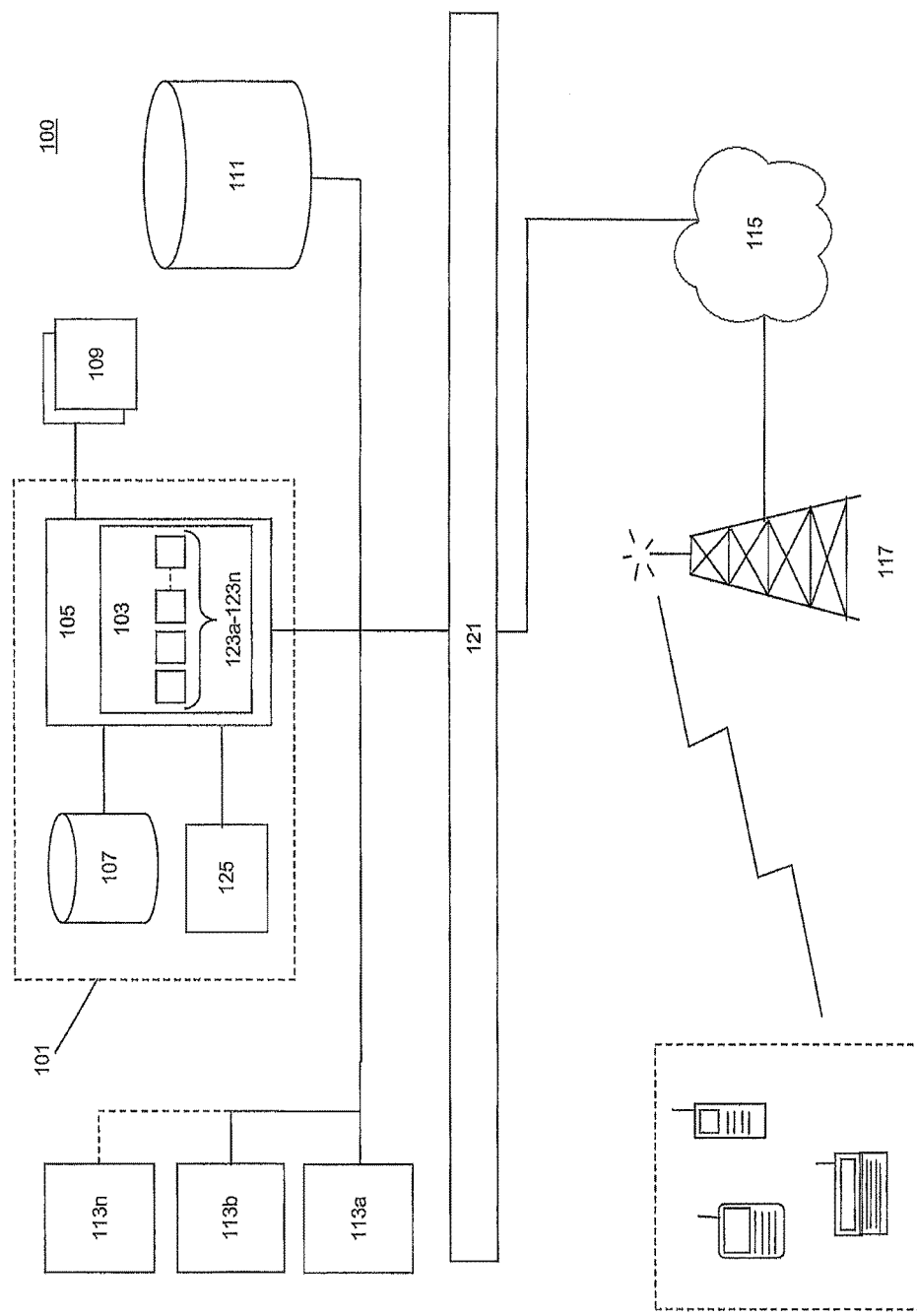
FIG. 1 illustrates an example of a computing environment wherein an example of the system of the invention may operate, according to various embodiments of the invention.

FIG. 1 illustrates an example of a computing environment 100, wherein a system 101 for managing mobile devices may be employed by an enterprise. System 101 may include a mobile device management (MDM) application 103, an MDM server 105, an MDM database 107, one or more portals 109 and/or other elements. In some embodiments, system 101 may communicate with, interact with, or otherwise exchange data with an enterprise directory 111 and/or other elements of an enterprise information technology (IT) infrastructure, one or more platform servers 113a-113n, network 115, wireless infrastructure 117, one or more mobile devices 119a-119n and/or other elements. In some embodiments, computing environment may include an enterprise firewall 121 that provides a security gateway limiting access to one or more of MDM application 103, MDM server 105, MDM database 107, enterprise directory 111, platform servers 113a-113n or other elements of the enterprise's IT infrastructure.

In some embodiments, MDM application 103 may include a computer-implemented software application having one or more modules 123a-123n for performing one or more features and functions of the invention such as, for example, provisioning of mobile devices 119 to end users, discovery of mobile devices 119, receipt of end user information, receipt of mobile device related information, registration of mobile devices 119, bootstrapping of mobile devices 119, performing management tasks for mobile devices 119 (including assigning/applying policies to mobile devices 119 and other management tasks), receiving and displaying status, configuration, or other information regarding mobile devices 119, communicating with platform servers 113a-113n and/or agents or modules thereof to facilitate interaction with mobile devices 119, generating one or more reports or alerts, supporting one or more graphical user interfaces (GUIs) or other interfaces (including portals 109, end user interfaces, or other access points to MDM application 103), and/or for performing other features of functions of the invention disclosed herein. In some embodiments, one or more modules 123a-123n may include an access control module 123a, a registration module 123b, a management module 123c, a monitoring module 123d, a web services module 123e, and/or other modules.

In some embodiments, MDM application 103 and or one or more of modules 123a-123n may operate on or be compatible with Sun Solaris, Microsoft Windows SUSE Linux, Red Hat Linux or other operating systems.

In some embodiments, MDM server 105 may include one or more server machines or other computing devices having one or more processors and associated memory for receiving and carrying out instructions necessary to support the features and functions of MDM application 103. In some embodiments, MDM server 105 may include multiple MDM servers on which the features and functions of MDM application 103 may be distributed. In some embodiments, MD server 105 may include multiple MDM servers that may be distributed geographically. In some embodiments, MDM server 105 may provide web services via WSI (a software system that supports interoperable machine to machine interaction over a network) within firewall 121. As used herein, web services may refer to web application programming interfaces (APIs) that may be accessed over a network such as, for example, the Internet, and executed on a remote system hosting requested services.

In some embodiments, MDM database 107 may include or interface to, for example, any data storage or query formats, platforms, or resources such as OLAP (On Line Analytical Processing), SQL (Standard Language Query), a SAN (storage area network), Microsoft Access™ or others may also be used, incorporated, or accessed into the invention. In some embodiments, the design of MDM database 107 may support both MS™ SQL Server and Oracle™ formats. In some embodiments, MDM database 107 may include any combination of multiple databases or other data storage devices, and may receive and store information utilized by the features and functions of the invention disclosed herein. In some embodiments, product tables for mobile devices 119a-119n may exist in MDM database 107.

In some embodiments, portals 109 may include access points to MDM application 103 for one or more administrative users and/or end users (wherein they may be referred to as "end-user portals"). In some embodiments, a portal 109 may include, support, or present one or more GUIs or other interfaces whereby administrative or end users interact with MDM application (e.g., provide instructions to MDM application 103, receive information from MDM application 103, or other interaction). In some embodiments, portals 109 may include computer monitors or other display devices and one or more input devices (e.g., keyboard, mouse, or other input device). In some embodiments, the display devices and input devices may exist at MDM server 105, or at a terminal in communication with MDM server 105. In some embodiments, the connection between a portal 109 and MDM server 105 may include network 115, which may include the Internet.

In some embodiments, enterprise directory 111 may include a database or other data store wherein information regarding employees of the enterprise or other persons who may utilize one or more of mobile devices 119a-119n, information regarding one or more devices 119a-119n, or other information is stored. In some embodiments, enterprise directory may include a Microsoft™ Active Directory, a lightweight directory access protocol (LDAP) directory, or other type of enterprise directory. In some embodiments, enterprise directory 111 may be supported by one or more computing and data storage devices of the enterprise's IT infrastructure.

In some embodiments, enterprise directory 111 may include information regarding employees of the enterprise or other persons associated with the enterprise. This information may include a name, position or title, home address, work address, telephone number, information relating to the person's permissions within the enterprise's IT network or other information. In some embodiments, the enterprise utilizing MDM application 103 may utilize enterprise directory 111 for authentication to the enterprise's IT network and authorization thereto by virtue of stored information regarding the "enterprise role" or other permission status indicator of users. In some embodiments, an "enterprise role" may include an employee's status and permissions within the enterprise's IT infrastructure (which may be dependent on job description, department, seniority, or other factors). As the enterprise may require that MDM application 103 comply with their enterprise policies and enterprise authentication/authorization/audit framework for its IT infrastructure, MDM application 103 may utilize the enterprise directory 111 for its authentication and authorization. In doing so, MDM application 103 may utilize enterprise role information or other information regarding users within enterprise directory 111 to dictate access, permissions, configuration of mobile devices 119, and/or other features within the invention.

In some embodiments, one or more platform servers 113a-113n may include one or more servers or other computer-implemented infrastructure (including databases and data stores) that provide support for the function of mobile devices 119a-119n. In some embodiments, platform servers 113a-113n may include platform servers of various types, each of which provide support for mobile devices of different types. For example, in some embodiments, platform servers 113a-113n may include a first platform server (e.g., a platform server 113a) that supports mobile devices of a first type (e.g., a mobile device 119a), a second platform server (e.g., a platform server 113b) that supports mobile devices of a second type (e.g., a mobile device 119b), a third platform server (e.g., a platform server 113c) that supports mobile devices of a third type (e.g., a mobile device 119c), and additional platform servers that support additional disparate types of mobile devices. Generally, a different platform server 113 supports mobile devices 119 of a single type, which may be manufactured or distributed by a common entity. However, in some embodiments, mobile devices 119 of the same type may include mobile devices 119 of different models (e.g., different models of Blackberry™ devices).

In some instances, mobile devices of different types may communicate or perform certain actions or functions using different (sometimes proprietary) instructions or methods. For example, in some instances, platform servers 113a-113n may include a Blackberry™ Enterprise Server (e.g., an RIM™ Blackberry™ BES server behind firewall 121 with a BRK toolkit and a BES database) which may support Blackberry™ mobile devices 119; a Nokia™ mobile device platform server may support Nokia™ or compatible mobile devices 119; and a Microsoft Mobile™ platform server (e.g., a Microsoft PowerShell™ module that may communicate remotely with Microsoft Exchange™ Servers with SP2 to enable management of Microsoft Mobile™ devices via MS Exchange) which may support Microsoft Mobile™ compatible mobile devices 119. Other platform servers 113 may support other types of mobile devices 119.

Accordingly, a certain type of platform server 113 and its corresponding mobile devices 119 may utilize one or more agents or modules specific to the particular platform to interact and perform various features and functions. In some embodiments, MDM application 103 utilizes these platform-specific agents or modules, already existing in a specific mobile device platform to accomplish various management or other tasks without the need for MDM application 103 itself to include agents or modules specific to each mobile device platform. As such, the invention provides an abstraction layer between a single management application and mobile devices of numerous types, as discussed herein.

Network 115 may include any one or more of, for instance, the Internet, an intranet, a PAN (Personal Area Network), a LAN (Local Area Network), a Wi-Fi (wireless LAN), a WAN (Wide Area Network), a SAN (Storage Area Network), or a MAN (Metropolitan Area Network). Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, or other connection.

Wireless infrastructure 117 may include cellular phone, wireless internet, or other wireless data infrastructure known in the art used to exchange data with wireless mobile devices 119a-119n. In some embodiments, wireless infrastructure 117 may include support for wireless application protocol (WAP), short message service center (SMSC), and/or support for other wireless services.

As disclosed herein, in some embodiments, one or more mobile devices 119a-119n may include one or more wireless telephonic and/or computing devices such as, for example, cellular phones, smartphones, personal digital assistants (PDAs), handheld computing devices, pagers, or other mobile devices. For example, in some embodiments, one or more mobile devices 119a-119n may include one or more Blackberry™ devices, Nokia™ mobile devices, Microsoft Mobile™ devices, and/or other wireless mobile devices. In some embodiments, one or more mobile devices 119a-119n may include one or more laptop computers or other wireless computers.

In some embodiments, mobile devices 119a-119n may be associated with a logical state describing a mobile device's relationship with MDM application 103. These logical states may be utilized to track the asset lifecycle of mobile devices within the enterprise. In some embodiments, these logical states may be utilized with asset management applications (e.g., CA™ UDSM Asset Manager) that track other assets of the enterprise so as to provide management capability of mobile devices 119 in the context of the enterprise as a whole.

In some embodiments, the logical states of mobile devices 119a-119n may include; "unmanaged," wherein a mobile device 119 is not registered in the product; "discovered," wherein a mobile device 119 is automatically discovered within enterprise directory 111; "registered" or "classified," wherein a device is associated with an end user; "scheduled-for-bootstrap," wherein an administrative user has selected a mobile device 119 to be bootstrapped (mobile devices "scheduled for bootstrap," an email message or other alert may be sent to the owner of the mobile device, which may be scheduled for an initial "policy push" of an appropriate end user enterprise role); "managed," wherein a registered mobile device 119 is successfully bootstrapped, or other logical states.

In some embodiments, a managed device may become unmanaged if it is destroyed (in, some embodiments, the end user of a destroyed mobile device 119 may be assigned a new unmanaged device), if an end user leaves the enterprise and the mobile device 119 is the personal property of the end user, if the end user leaves the enterprise and the device is put back into a pool of unmanaged devices, if the end user receives another mobile device 119 (e.g., a new model) and the device is put back into a pool of unmanaged devices, and/or for other reasons.

Those having skill in the art will appreciate that the invention described herein may work with various system configurations and that the description given herein regarding computing environment 100, system 101, and other elements thereof is an exemplary configuration. Other configurations may exist. Accordingly, more or less of the aforementioned system components may be used and/or combined in various embodiments. In other embodiments, as would be appreciated, the functionalities described herein may be implemented in various combinations of hardware and/or firmware, in addition to, or instead of, software.

In some embodiments, the systems and methods of the invention may support multiple types of users, which may be defined as different user "types." For example, in some embodiments, four different user types may be supported: 1) systems administrators, 2), service desk analysts, 3) application administrators, and 4) end users. In some embodiments, other types of users may be defined. In some embodiment, systems administrators, service desk analysts, and application administrators may be referred to herein as "administrative users."

In some embodiments, a systems administrator may be a "power user" of the MDM application 103, and may be responsible for monitoring and maintaining various aspects of the configuration of MDM application 103. In some embodiments, the systems administrator may have access to all functions of MDM application 103, which may be accessed, for example, via a portal 109. In some embodiments, the systems administrator may perform one or more systems administration functions such as, for example, end user administration, networking configuration and administration, performance management of MDM application 103, security administration, basic scripting techniques to automate processes, troubleshooting and working toward resolving any root cause issues within the computing environment in which MDM application 103 operates (e.g., environment 100), and/or other functions.

In some embodiments, a service desk analyst may perform a "help desk user" role in connection with MDM application 103. As such, in some embodiments, a service desk analyst may have access to management components of MDM application 103 with regard to management of the one or more mobile devices 119a-119n. In some embodiments, service desk analysts may be responsible for executing "day-to-day" tasks of the mobile device management processes such as, for example, incident management processes, and acting as a first point of contact for end users. In some embodiments, service desk analyst may be responsible for various tasks regarding mobile device management using MDM application 103 such as, for example, ensuring that incidents are properly recorded, classified, and given initial support during the initial phases of an incident life cycle. In some embodiments, a service desk analyst may "own" an incident from start to resolution and may perform all activities required to assign an incident and to make sure other supporting groups are working according to any applicable support policy. In some embodiments, MDM application 103 may be accessed by the service desk analyst, for example, via a portal 109.

In some embodiments, an application administrator may be responsible for the installation of MDM application 103 to an enterprise IT infrastructure, maintenance of MDM application 103, backup of data (e.g., MDM database 107 and MDM application 103), upgrades of MDM application 103, and administration of the administrative users of the product (e.g., systems administrator, service desk analyst) but need not interact with MDM application 103.

In some embodiments, end users may include the users of mobile devices 119a-119n which may have access to MDM application 103 via their user devices 119 or via and end user portal (e.g., portal 109 or other computer-implemented terminal connected to MDM server 105). In some embodiments, a single end user may be associated with multiple mobile devices 119.

In some embodiments, a single user may operate as two different types of users. For example, an employee in the IT department of an enterprise may be serve as a service desk analyst within the invention, but, in some instances, may also be classified as an end user as the employee likely has one or more mobile devices 119 used for his or her employment.

In some embodiments, end users may be associated with a logical state describing their relationship to MDM application such as, for example, "un-provisioned," wherein an end user is not registered in MDM database 107; "unmanaged," wherein an end-user's mobile device 119 is not bootstrapped; a new end user may have the logical state of "unprovisioned-&-unmanaged;" after an end users' mobile device 119 is provisioned by being discovered and registered, the end user becomes "provisioned-&-unmanaged;" after the mobile device 119 is bootstrapped, the end user becomes "provisioned-&-managed." In some embodiments, a "provisioned-&-managed" user can become "un-provisioned-&-unmanaged" when an end user is de-provisioned (e.g., when an employee leaves the organization and disappears from enterprise directory 111). In some embodiments, the logical states of end-users may be utilized for asset lifecycle management of mobile devices 119a-119n and/or for other purposes.

In some embodiments, access control module 123a or other module of MDM application 103 may control access to the various functions of MDM application based on a user's type. In some embodiments, one or more functions of MDM application may be inaccessible based on a user's identified type. For example, as discussed herein a systems administrator may have access to all of the features and functions of MDM application, while a service desk analyst may have access to a lesser set of functions. Further still, an end user may have access to a still smaller set of functions of MDM application 103 (e.g., may be able to provide certain personal information or information regarding their user device 119 and may be able to view information related to their mobile device 119, but may not be able to apply policies to any mobile devices 119a-119n). In some embodiments, different users of the same type may have varying levels of accessibility to functions of MDM application 103 (e.g., some service desk analysts may have more access than others). In some embodiments, access control module 123a may control access to the features and functions of MDM application such that users may not be presented with GUIs or other interfaces for functions to which they do not have access according to their type (i.e., users only see functions that they can utilize).

In some embodiments, MDM application 103 may operate in one of two modes: 1) standalone and 2) integrated. In the standalone mode, MDM application 103 may operate in isolation from other enterprise information technology (IT) products. In some embodiments, in the standalone mode, all management functions of MDM application 103 may be initiated by an administrative user. In the integrated mode, MDM application 103 may operate in conjunction with other enterprise IT applications such as, for example, Unicenter™ Desktop and Server Management (UDSM) products from CA™. In some embodiments, MDM application 103 may also be utilized be utilized with an authentication and authorization application or module (e.g., eTrust™ IAM Toolkit from CA™); a report writing application or module that generates, customizes, and operates specific reports on data in application databases (e.g., CA™ standard Report Writer: Business Objects); an application or module that creates and operates process flow programs where steps of the flow are dependent upon specific programmatic parameters (which may handle the execution of business processes in relation to MDM application 103, e.g., CA™ Workflow Engine); one or more user interface modules that may be used with MDM application 103 such that the look and feel of the GUIs or other interfaces supported by MDM application 103 may provide a similar style and operation as the other enterprise IT applications used with MDM application 103 (e.g., JavaServer Faces [JSF] or other modules or elements); a federated or other database of common information concerning IT components that can be shared among the different enterprise IT products used together (e.g., a CA™ MDB R2); a licensing program used to monitor contracted use of enterprise IT applications or other licensed software (e.g., CA™ lic98™, License IT™, or other licensing software), and/or other IT applications.

Figure 2:
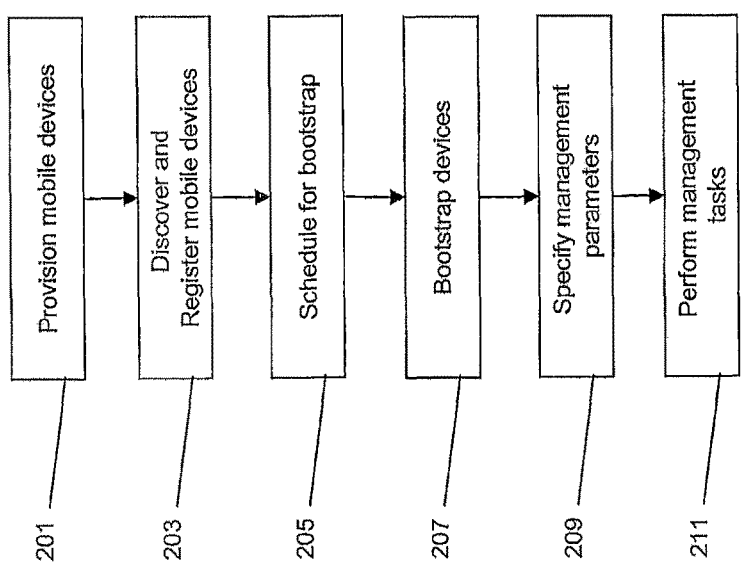
FIG. 2 illustrates an example of a process for registering, bootstrapping, and performing management tasks for mobile devices, according to various embodiments of the invention.

FIG. 2 illustrates a process 200, which is an example of a process for managing a plurality of mobile devices according to various embodiments of the invention. Process 200 may include an operation 201, wherein one or more mobile devices 119*a*-119*n* may be provisioned to one or more end users. Provisioning may include a process by which mobile devices 119 are delivered or otherwise provided to end users.

In an operation 203 the one or more provisioned mobile devices 119 may be discovered and registered to one or more end users. In some embodiments, registration to end users may include associating an end user with a telephone number or other identifier of a mobile device 119. In some embodiments, an enterprise utilizing an enterprise directory (e.g., enterprise directory 111) may associate the telephone number and/or other identifier of a mobile device 119 with an end user listed within enterprise directory 111. In some instances, the enterprise may have an internal process for a new employee that registers a mobile device 119 with the employee, for example, in an asset inventory, in a corporate directory/address list, or other data store. In some embodiments, a registration module 123*b* or other module of MDM application 103 may extract the phone numbers and/or other identifiers regarding mobile devices 119*a*-119*n* and end user information from enterprise directory 111 into MDM database 107. The registration module may then associate the phone and/or other identifiers with their respective end users.

In some embodiments, enterprise directory 111 may include name, address, enterprise role, and/or other information regarding end users. Some or all of this information may be associated with a mobile device 119 during mobile device registration. In some embodiments, associating enterprise role information of a user with a mobile device may enable MDM application to determine the access level that the end user has to MDM application 103 (e.g., what functions the end user should be able to access which may be used to determine the user's user type with respect to MDM application 103), what policy or other configuration information should be applied to the end user's associated mobile device 119, or other information.

In some embodiments, a PIN number or IMEI number of a mobile device 119 may be used for registration of a mobile device in addition to, or in place of, a phone number. In some embodiments, mobile device manufacturer, model, and/or other information regarding a mobile device 119 may also be used. In some embodiments, registration module 123*b*, may associate each of mobile devices 119*a*-119*n* with a unique device "name." In some embodiments the unique device name may include a device class or type identifier, a unique manufacture number, and/or other information. For some mobile devices 119, the unique manufacturer number may include an identifier or number assigned by the manufacturer. For example, for devices that use an International Mobile Equipment Identifier (IMEI), such as GSM phones, the string "IMEI," followed by a colon (:), followed by a valid 15-digit number may be used (e.g., IMEI: 123456789000000). In another example, for devices that use a Mobile Equipment Identity (MEID), the string "MEID," followed by a colon (:), followed by a valid 15-digit number, may be used (e.g., MEID:123456789000000). In yet another example, for devices that use an Electronic Serial Number (ESN), such as CDMA phones, the string "ESN," followed by a colon (:), followed by a valid 8-digit number may be used (e.g., ESN:12345678). Other names or identifiers may be used. In some embodiments, this information or other information regarding mobile devices 119*a*-119*n* may be stored in enterprise directory 111.

In some embodiments, registration module 123*b* or other module of MDM application 103 may provide a graphical user interface (GUI) by which an administrative user (e.g., a systems administrator) may input parameters of enterprise directory 111 for automated registration by registration module 123*b* (e.g., the administrative user may specify the location of enterprise directory 111 to be used, the name of the fields to be pulled by registration module 123*b* from enterprise directory 111 into MDM database 107, or other parameters). In this manner, the systems administrator or other administrative user essentially "points to" enterprise directory 111 and initiates a "discovery" of end user and mobile device information (e.g., user id, email address, enterprise role information, cell/mobile phone number, manufacturer number, device name, PIN number, serial number, and/or other information). In some embodiments, the GUI or other interface may enable an administrative user to define "pulling" criteria for retrieving mobile device or end user information from the defined directory or location in enterprise directory 111. For example, the GUI or other interface may enable the administrative user to create a query to be used to pull mobile device or end user information.

In some embodiment the GUI or other interface may enable an administrative user to define a schedule (e.g., daily, weekly, bi-weekly, monthly, or other schedule) on which end user status or mobile device may be updated within MDM database 107. In some embodiments, updates may occur upon occurrence of a predefined event, or upon command of an administrative user (e.g., ad-hoc). In some embodiments, a report of changes in end user or mobile device status may be provided to an administrative user via a report or alert for subsequent processing (e.g., provisioning, de-provisioning, configuration changes, or other processing). In some embodiments, the administrative user may need to manually interact with MDM application 103 to process these changes.

Figure 3A:
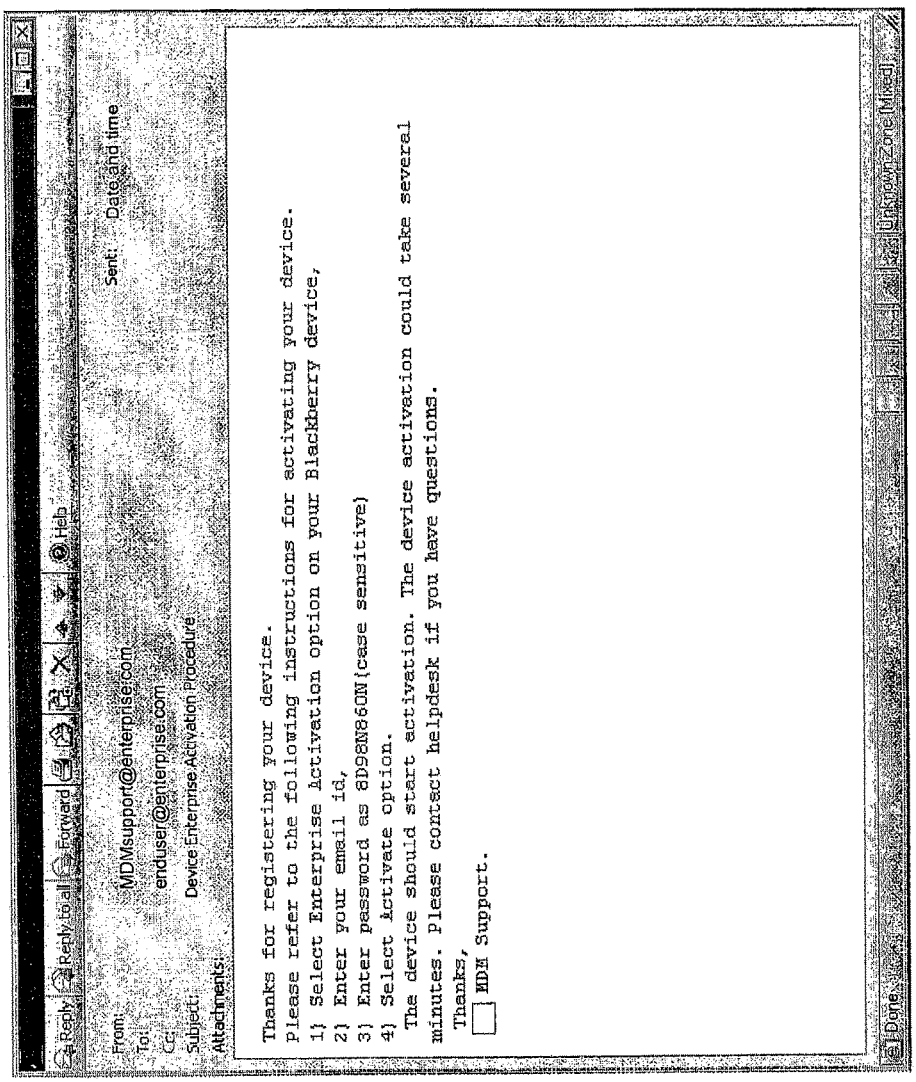
FIG. 3A illustrates an example of a communication to an end user providing registration instructions according to various embodiments of the invention.

In some embodiments, registration of mobile devices 119 to end users may include one or more manual actions by end users or administrative users (e.g., entering end user or mobile device information, providing an association between end users and mobile device information, or other actions). In some embodiments, once a mobile device is discovered, the GUI supported by registration module 123*b* may display a template email message that may be sent to end users to explain to them that they will need to go to access MDM application 103 (e.g., via portal 109) complete registration of their mobile device 119. FIG. 3A illustrates an example of an email to an end user providing such instructions.

In some embodiments, the mobile device information, end user information, and/or associations between them stored in MDM database 107 may be synchronized with enterprise directory 111 (using one-way synchronization, i.e. enterprise directory 111 may always be authoritative, and no updates may be written back to enterprise directory 111). In some embodiments, MDM database 107 may synchronize with enterprise directory 111 on a regularly scheduled basis. In some embodiments, MDM database 107 may synchronize with enterprise directory 111 upon the occurrence of an event (e.g., the addition of a new end user or mobile device 119), predetermined condition, and/or upon an administrative user command. In some embodiments, registration module 123*b* or other module of MDM application 103 may provide administrative users reports or alerts regarding user or mobile device additions, deletions, or other changes. In some embodiments, the reports or alerts (or other reports or alerts disclosed herein) may be provided to administrative user on a GUI through, for example, portal 109.

Figure 3B:
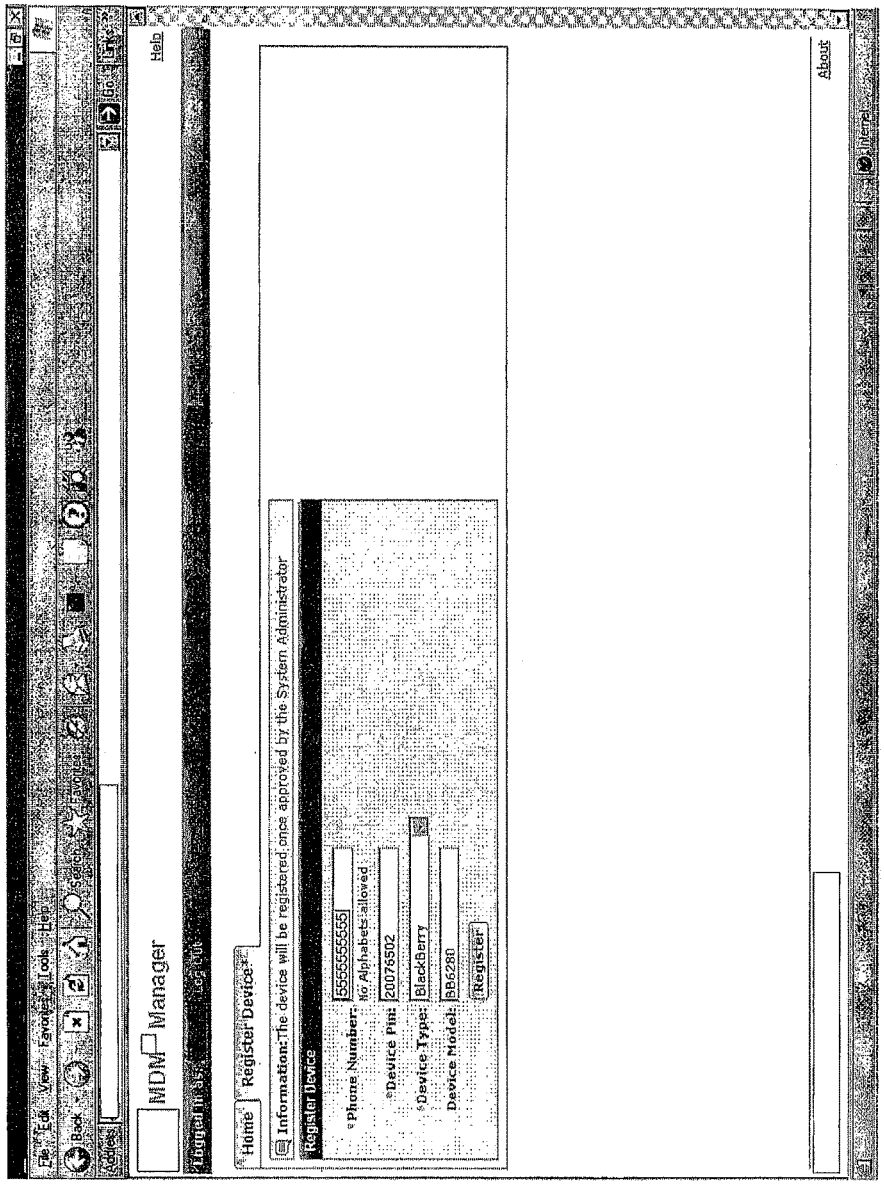
FIG. 3B illustrates an example of an interface for entering mobile device information according to various embodiments of the invention.

In some embodiments, MDM application need not operate in the presence of enterprise directory 111. In some embodiments, wherein an enterprise directory 111 is not present, one or more GUIs supported by registration module 121 or other module of MDM application 103 may enable end users or administrative users to register their own mobile devices 119 or the mobile devices 119 of others manually (e.g., by presenting an electronic form through which the administrative or end user may enter information regarding the mobile device 119 and/or the end user). The information entered may include a user id and/or password (to authenticate the end user to MDM application 103; authentication may also utilize an enterprise security application such as those disclosed herein), a phone number and/or other identifier for the mobile device 119, a device type (in some embodiments, the GUI may include a pull down menu for selection of device types, wherein the contents of the pull down menu may come from a list of supported devices provided to MDM application 103 by an administrative user, as described herein), a wireless service provider/operator (in some embodiments, the GUI may include a pull down menu, wherein the contents of the pull down menu may come from a list of supported service providers operators provided to MDM application 103 by an administrative user, as described herein), mobile device make and/or model, which may take the form of an a unique manufacturer number as described herein (the value of the unique manufacturer number may be checked by registration module 123*b* for correct syntax). FIG. 3B illustrates an interface 300*b*, which is an example of an interface whereby information regarding a mobile device 119 may be entered into MDM database 107 for registration (or for other purposes)

In some embodiments, CSV (comma separated variables) files or other delineated file format may be used for batch registration in the absence of enterprise directory 111.

In some embodiments, registration module 123*b* or other module of MDM application 103 may enable bulk addition of users to MDM database 107 via a bulk loading template. In some embodiments, the template may be an MS Excel™ spreadsheet that may generate XML format. Other formats may be used. In some embodiments, the template may include multiple fields such as, for example, user Id key, BES™ (for RIM™ devices), RIM™ PIN (for RIM™ devices), Wireless Access Password (for RIM™ devices generated randomly), an IT policy identifier, and/or other information.

In some embodiments, the GUI or other interface provided by registration module 123*b* may enable an administrative user to create and maintain end users or administrative users on MDM database 107 and define their roles or permissions. In some embodiments, the GUI or other interface may provide the administrative user with a list of end users and associated enterprise roles and enable the administrative user to edit information associated with an end user so as to enable management of end users. In some embodiments, the administrative user may nominate certain end users who may constitute exceptions to a pre-defined enterprise role in situations wherein certain end users require additional privileges. In these instances, the nominated end users may be tagged in MDM database 107 as an exception to their predefined enterprise role so that later directory synchronizations will not move them back to their original enterprise role. In some embodiments, administrative users may receive a report or alert listing some or all "exceptions" regarding end user enterprise roles in MDM database 107.

In some embodiments, users (end users and administrative users) may be authenticated whenever interacting with MDM application 103 via portal 109 or other access point. In some embodiments, authentication may include a user providing a username and/or a password. In some embodiments, users may be authenticated against enterprise directory 111. As such, in some embodiments, a user's enterprise role information and/or other information may be used to authenticate a user to MDM application 103.

In some embodiments, authentication may utilize or cooperate with a separate enterprise security application such as, for example, eTrust™ IAM Toolkit from CA™, wherein the security application provides an interface into enterprise directory 111. The security application may oversee authentication against enterprise directory 111 and, in some embodiments, may utilize an NTLM (Microsoft Windows™ NT LAN Manager) authentication scheme. In some embodiments, wherein a platform server 113 includes a Blackberry™ Enterprise Server (BES), information regarding Blackberry™ mobile devices and/or user information may be extracted from the BES instead of or in addition to enterprise directory 111.

In some embodiments, registration module 123*b* or other module of MDM application 103 may enable one or more GUIs whereby administrative users may define a list of supported service providers/operators (e.g., Verizon™, AT&T Wireless™, or other wireless service provider/operator) that may be used with mobile devices 119*a*-119*n* within the invention. In some embodiments, the list of supported service providers may also may be used to define the types of mobile devices 119 that can be managed by MDM application 103. In some embodiments, the list of supported service providers and mobile device types may be used such that a user may not be able to register a non-supported mobile device or a device operated by non-supported service provider. In some embodiments, registration may be enabled for any type of mobile device or service provider thereof.

In an operation 205, the one or more mobile devices 119 may be scheduled for bootstrapping within MDM application 103. Bootstrapping refers to a pushing of an initial policy or other set of instructions to a mobile device 119, which brings the mobile devices 119 into a manageable and operational state in relation to MDM application 103. In some embodiments, once a plurality of mobile devices 119 are registered within MDM application 103, an administrative user (e.g., a service desk analyst) may utilize a GUI provided by a management module 123*c* or other module of MDM application 103 to select from the plurality of mobile devices 119 (e.g., via a pull down menu, a query, or other selection process) and request that the selected mobile devices 119 be scheduled for bootstrapping.

In some embodiments, management module 123*c* or other module of MDM application 103 may provide a GUI or other interface enabling an administrative user (e.g., a service desk analyst) to schedule the bootstrapping of groups of devices at specific times and set an option to initiate bootstrapping immediately when an end user completes appropriate device information.

In an operation 207, one or more mobile devices scheduled for bootstrapping may be bootstrapped by management module 123c or other module of MDM application 103 by pushing an initial policy or other instruction sets to the mobile devices 119 bringing them under management by MDM application 103. In some embodiments, the initial policy or other instruction set applied to a mobile device 119 during bootstrapping may be set, at least in part, by using the enterprise role of the end user to which the mobile device is associated. As such, the policy includes the correct settings, permissions, or other characteristics or the end user's enterprise role.

In some embodiments, the policies or instructions of the bootstrapping process (or other management process of the invention), may utilize one or more agents or modules of platform servers 113a-113n to push the policies or instructions to various mobile devices 119a-119n. For example, to bootstrap or otherwise push a policy to a mobile device 119 which is a Blackberry™ device, management module 123c may interface with the platform server 113 supporting the blackberry device (e.g., the Blackberry Enterprise Server™). Management module 123c communicates to the Blackberry Enterprise Server™ what it requires the Blackberry Enterprise Server™ to communicate in terms of policy or other instructions to the Blackberry™ device 119. One or more agents or modules of the Blackberry Enterprise Server™ then push the policy or instructions to the Blackberry™ device 119 in the format and manner appropriate for the Blackberry™ device. Similarly, if a mobile device 119 is a Microsoft Mobile™ device, then management module 123c communicates the policy or other instructions to the platform server 113 managing Microsoft Mobile™ devices, which, in turn, utilizes one or more of its agents or modules to push the policy or instruction to the Microsoft Mobile™ devices in the format and manner appropriate for Microsoft Mobile devices. Other mobile devices 119 may be bootstrapped/managed by their respective platforms servers 113 using agents or module resident on or otherwise specific to the individual platform servers 113. In this manner, MDM application 103 need not know the manner and format or other platform-specific information to uniformly manage a plurality of mobile devices of different types, thus providing an abstraction layer between a single management application and mobile devices of various types.

In some embodiments, the bootstrap process may take place over the air (OTA). OTA bootstrapping or other management may be accomplished by the platform servers 113a-113n initiating over the air communications via network 115 and wireless infrastructure 117 (which may include the infrastructure and/or action of wireless service providers associated with mobile devices 119a-119n). In some embodiments, one or more mobile devices 119a-119n may be bootstrapped or otherwise managed via a "cradled connection," whereby the mobile devices are connected to network 115 via a wired connection.

In some embodiments, wherein certain platforms are used such as, for example, Windows Mobile 5.0 or similar mobile devices 119, bootstrapping may involve pushing cab provisioning files (CPF) to mobile devices 119 supported by such platforms. For example, in some embodiments, system 101 may include an OTA content server 125, which may store CPF files. In some embodiments, CPF files may include digitally signed files that include configuration information concerning servers that are authorized to manage devices over the air. In some embodiments, some platforms may not utilize CPF files, but may utilize bootstrapping files stored in OTA content server 125.

In some embodiments, a separate CPF file may exist for each supported mobile device 119 model utilizing the OTA content server. As such, CPF files for each supported mobile device model may need to be created and installed on OTA content server 125. The CPF files may be sent to the respective managed mobile devices 119 via the network 115 (e.g., via email) or via another method. The CPF files may then be executed on each of the managed mobile devices 119. Once the CPF file are executed on mobile devices 119 they are able to be managed by MDM application 103. Management module 123c or other module of MDM application 103 may provide for the assembly of the CPF files (e.g., via a template—Velocity™ or other template) using model information, carrier access information and MDM server 105 identification. In some embodiments, CPF files may not be used with all platform types (e.g., Blackberry™ devices), but may only be used for Window Mobile 5 or similar devices.

When mobile devices 119 are successfully bootstrapped, they may be managed by MDM application 103. In an operation 209, one or more administrative users may specify one or more management parameters for one or more mobile devices 119a-119n. Management module 123c or other module of MDM application 103 may provide a GUI or other interface whereby the one or more administrative users may provide one or more management parameters.

Management parameters may define one or more management tasks to be performed using MDM application 103. Administrative users may utilize the one or more management tasks to manage mobile devices 119a-119n in a common manner regardless of the manufacturer, model, or platform of the devices. In some instances, an administrative user may be able to select a subset or group of all devices 119a-119n managed by MDM application 103 by, for example, creating a simple query, and apply a common management task to all the selected devices, regardless of differing models, platforms, or other differences among the selected devices. MDM application 103's utilization of agents or modules of the various platforms servers 113a-113n supporting the selected devices enables a common management task to be defined once by an administrative user and applied to the selected mobile devices 119, regardless of any platform differences. For example, when MDM application 103 needs to perform a management task or otherwise interact with a Blackberry™ mobile device 119, MDM application 103 (e.g., management module 123c) may interact with the one or more agents, modules or elements of the Blackberry Enterprise Server™ (e.g., BRK toolkit and BES database). As such, MDM application 103 need not directly communicate with the Blackberry™ mobile devices 119, and thus need not be configured to do so or have an administrative or end user who is trained to do so. In some embodiments, if a management task is not appropriate to a selected mobile device 119 (e.g., the managed feature is not installed), management module 123c may provide a report or alert regarding such inconsistencies, but may make a "best effort" to make an equivalent change (if possible) on the mobile device in question.

In an operation 211, management module 123c may instruct the appropriate platform server 113 to perform the management task, such that the task is carried out on the appropriate mobile devices 119.

In some embodiments, management tasks enabled by MDM application 103 may include: activating a deactivated device (i.e., unlocking a mobile device 119 that was locked from use), deactivating an activated device (i.e., locking use of a mobile device 119), wiping part or all of the contents of a mobile device 119 (for example, deactivating or wiping a device running a Microsoft Mobile™ operating system may be executed via programmatic interfaces using, for example, MS Powershell™, which may communicate with an adapter [e.g., MS Exchange 2007 SP2 adapter] for Microsoft Mobile™), change a password on a mobile device 119 with an out-of-band notification, change a policy/configuration of a mobile device 119, pulling and display of the status or other information of mobile devices 119, discover and register a mobile device 119 (i.e., discovering the mobile device 119 and end user information, storing the mobile device and end user information in MDM database 107, and associating the mobile device 119 with the end user), bootstrap a mobile device 119 (as described herein), reboot a mobile device 119, refresh a status/policy of a mobile device 119, display the history of operations on a specific mobile device 119 (which may be integrated into the operational logs discussed herein), nominate a service provider/operator plan that a mobile device 119 is billed to (e.g., for when a mobile device 119 is associated with multiple service plans such as, for example, one for domestic and one for international use), "rollback" or push the previous policy for a mobile device 119 (the "last policy" may be stored in MDM database 107 so as to be re-deployed when desired), and/or other management tasks. In some instances a MDM application 103 may include a utility to map service plans to end users or user groups so that the correct plan will be automatically assigned to the mobile device but so the mobile device can be individually overridden for use of another service plan). In some embodiments, additional management tasks that may be enabled by management module 123c or other module of MDM application 103 such as, for example, migration of an end user between mobile devices 119, wherein an end user may be switched from one mobile device 119 to another mobile device 119 of a different device platform (for example, from a Blackberry™ to a Moto Q™ [a Microsoft Mobile™ based device]); upgrading an end user's mobile device 119, wherein an end user is switched from one mobile device 119 to another mobile device 119 of the same device platform (for example, from an "i-mate JasJar™ to a Moto Q™ [both Microsoft Mobile™ based]); or other management tasks.

Figure 4A:
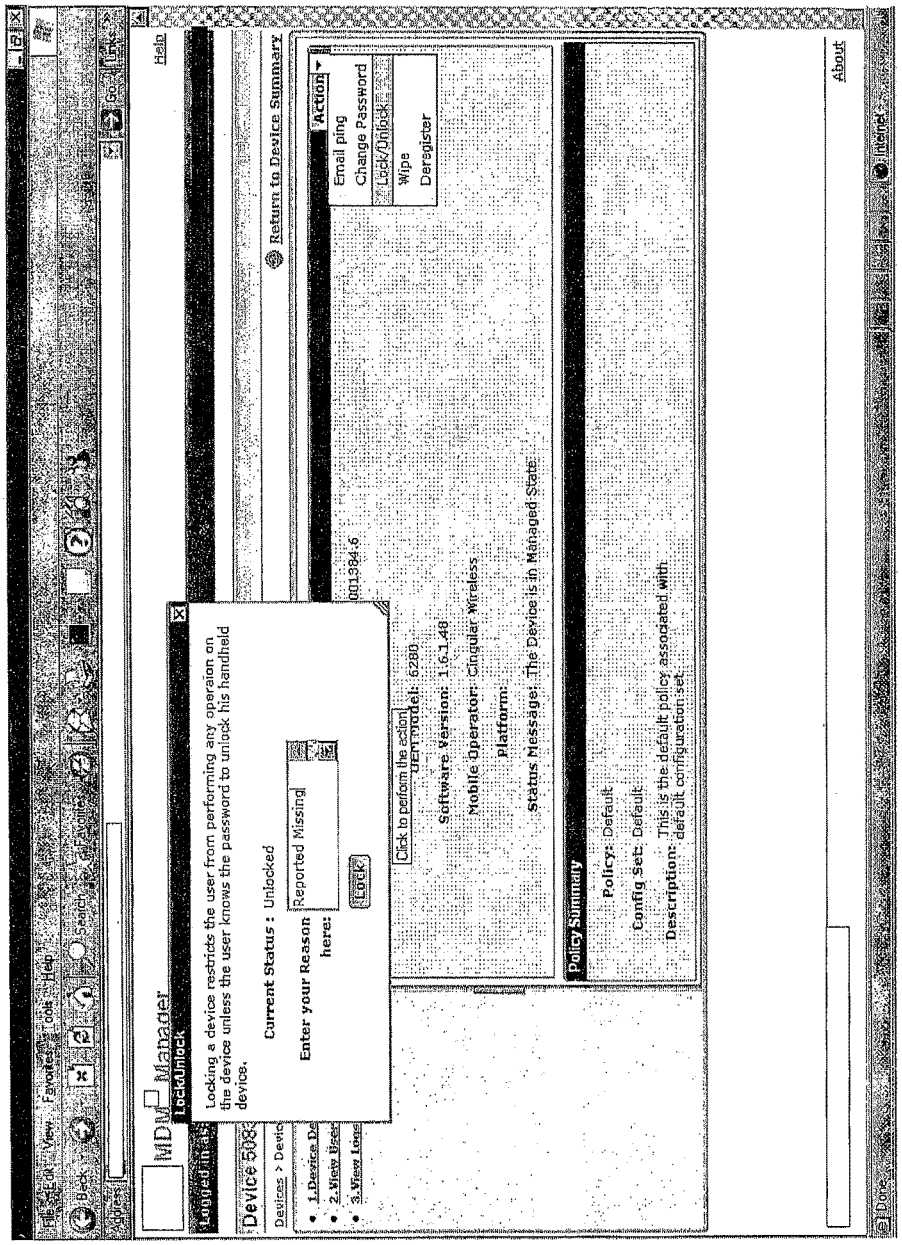
FIG. 4A illustrates an example of an interface for initiating a management task according to various embodiments of the invention.

FIG. 4A illustrates an interface 400a, which is an example of an interface that enables an administrative user to initiate a management task (the management task illustrated is locking a mobile device 119 and providing a reason for locking the device). Other interfaces may be used for initiating other management tasks.

In some embodiments, some or all of the management tasks may be enabled by management module 123c or other module of MDM application 103. In some embodiments, as discussed herein in relation to performance of bootstrapping, one or more management tasks may be performed using one or more agents or modules of platform servers 113a-113n. By using agents or module of the platform servers themselves, MDM application may be able to manage mobile devices of varying types and platforms, such that an administrative user need only define a management task once for multiple mobile devices 119 of different types, while platform servers 113a-113n may perform any platform-specific processing and communication necessary to carry out the management tasks on mobile devices 119 of different models, types, or platforms. In this manner, MDM application 103 provides an abstraction layer, that translates between a single defined management task, and multiple methods for performing that task (or similar tasks) on devices of differing platforms. In some embodiments, one or more management tasks may be performed OTA (may be pushed wirelessly).

In some embodiments, management module 123c or other module of MDM application 103 may enable an administrative user (e.g., a systems administrator) to initiate management by selecting a management task first and then choosing the set of mobile devices 119 or end users to be managed. In some embodiments, management module 123c or other module of MDM application 103 may enable an administrative user (e.g., a systems administrator) to initiate management by selecting a group of one or more mobile devices 119 or end users and then choosing the management task to be performed.

In some embodiments, management module 123c may enable an administrative user (e.g., systems administrator) to select a group of one or more mobile devices 119 for which to define a management task. In some embodiments, the administrative user may define a query to select the one or more mobile devices for a management task. The query may utilize one or more fields such as, for example, an end user/owner of a mobile device 119, a manufacturer of a mobile device 119, a model of a mobile device 119, a department (or other enterprise role information) of the end user of a mobile device 119, an operating system version and/or patch level of a mobile device 119, a location of a mobile device 119, a phone service provide/operator or other service provider/operator, or other fields. In some embodiments, queries may be named and/or saved after creation. Administrative users may then view and use named queries to be executed.

In some embodiments, wherein MDM application 103 is integrated with other IT management applications, administrative users may be able to view registered mobile devices 119 in an asset management context (including logical state information) that may be provided in conjunction with an asset management application that maintains a database of hardware and software configuration information for IT devices (e.g., servers, desktop computers, laptop computers, router, or other devices or IT infrastructure) to serve as a detailed inventory for these devices (an example of such an asset management application may include CA™ UDSM Asset Manager). In some embodiments, the asset management context may include a display of managed mobile devices in conjunction with some or all other information technology assets in the enterprise (e.g., servers, desktops, laptops, routers, databases other network infrastructure, or other assets). In some embodiments, one or more mobile devices may be selected from the view provided by the asset management application using query tools (e.g., UDSM query tools). In some embodiments, the asset management application (e.g., UDSM Asset Manager) may display available management tasks for the displayed mobile devices 119. In some embodiments, the asset management application may provide a management "screen" for each available management task (e.g., a UDSM screen). In some embodiments, the asset management application (e.g., the UDSM Asset Manager) may provide web services for MDM application 103 so that discovered mobile devices 119 may be added/deleted/changed in the asset management application database (e.g., the UDSM Asset Manager MDB). MDM application 103 may include specific GUI screens for each of the management tasks that can be initiated from the asset management application.

In some embodiments, configuration information to define the UDSM integration with MDM application 103 may be defined in an XML file which may be edited at installation time to point MDM application 103 to the UDSM components. In instances wherein MDM application 103 is integrated with the UDSM application, XML files may provide mobile device 119 information for entry into the UDSM database. As a result, users of the UDSM application may view the most recent information concerning mobile devices 119*a*-119*n* in the context of other IT devices and assets tracked by the UDSM application.

Figure 4B:
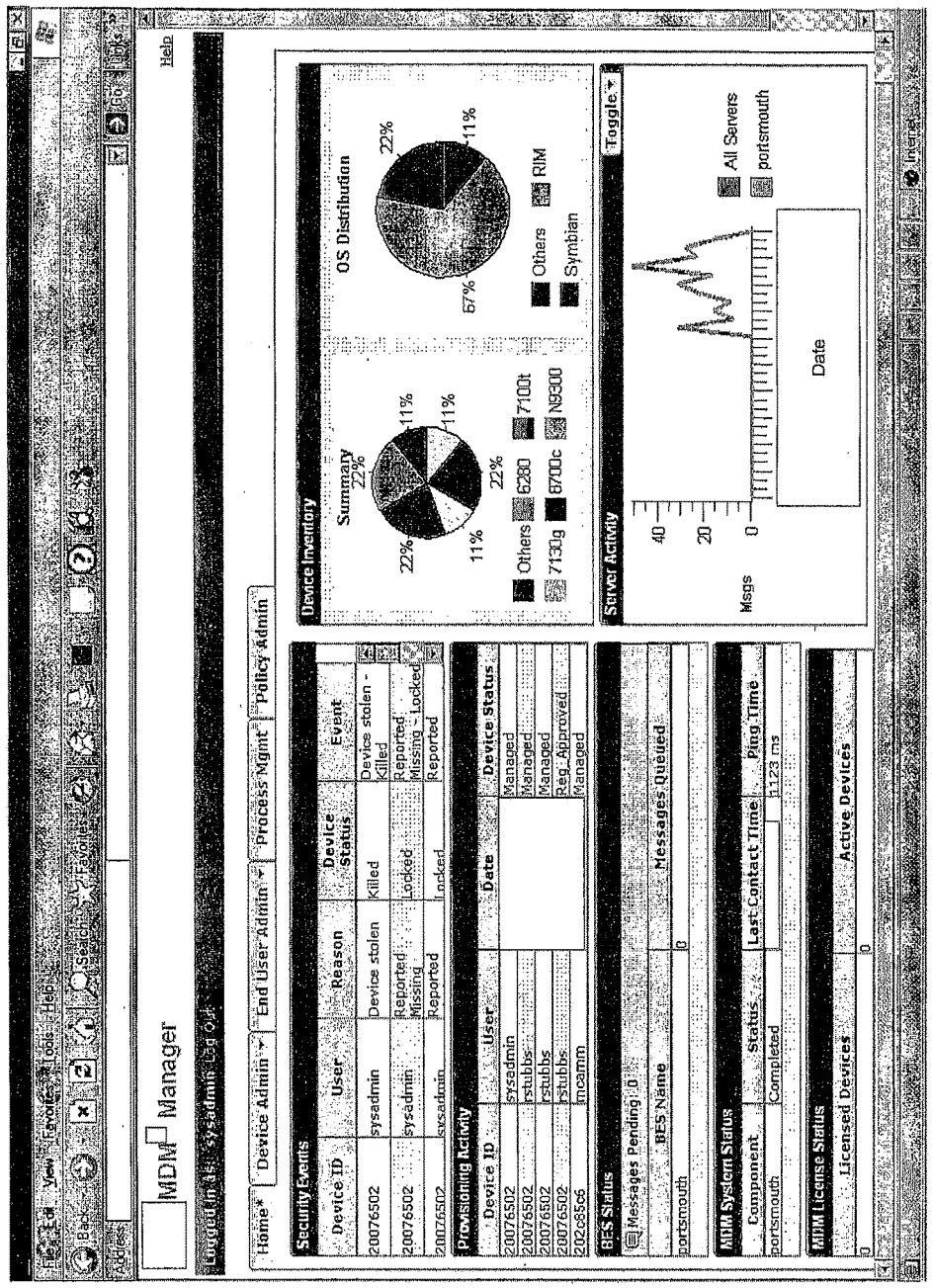
FIG. 4B illustrates an example of a dashboard interface providing information relating to one or more mobile devices according to various embodiments of the invention.

In some embodiments, management module 123*c* or other module of MDM application 103 may enable administrative users to view status information, configuration information, and/or other information regarding mobile devices 119*a*-119*n*. In some embodiments, management module 123*c* may provide one or more GUIs that display status, configuration, or other information regarding mobile devices 119*a*-119*n*. FIG. 4B illustrates an example of an interface 400*b*, which is a "dashboard" view, providing various types of information regarding multiple mobile devices 119 managed by MDM application 103. Information other than that illustrated in interface 400 and/or other formats for displaying or providing information regarding mobile devices 119 to users may be utilized. In some embodiments, display of status or information of mobile devices 119 may include an indication of the logical states of the devices so as to enable asset lifecycle management of the devices.

In some embodiments, one or more of the GUIs enabled by management module 123*c* or other modules of MDM application 103 may enable an administrative user to view configuration information regarding a mobile device 119 in manageable "chunks" or otherwise broken up into subsets. In some embodiments, the administrative users may be able to view and perform management tasks on all "managed objects" on a mobile device. A "managed object" may include a manageable component or element of a mobile device 119, such as, a Bluetooth™ interface, a browser configuration, a password policy, use of a camera element, or other object. In some embodiments, subsets of managed objects may be displayed similar to a Microsoft™ Windows XP Control Panel design, which may enable each managed object to be listed and expanded for detailed view and detailed management. In some embodiments, the detailed view may require a number of tabs to simplify configuration options.

In some embodiments, status, configuration, and/or other information for mobile devices 119 may include a logical state for a mobile device 119, a user for a mobile device 119, an OEM manufacturer for a mobile device 119, an OEM model for a mobile device 119, an OEM firmware version of a mobile device 119, an OEM platform mobile device 119, software version for a mobile device 110, a serial number for a mobile device 119 (for example, an IMEI number), a service provider/operator network for a mobile device 119, a phone number for a mobile device 119, a designated language for a mobile device 119, a geographic location for a mobile device 119, and/or other information for a mobile device.

As MDM application 103 may support mobile devices 119 from different manufacturers, of different platforms, and of different types, the various devices will invariably have a variety of features and different open mobile alliance (OMA) device management (DM) managed objects in their OMA DM trees. In order to define configuration for a "new" device type, an administrative user may access an updated supported device file, register the mobile device into MDM application 103 and bootstrap it. The administrative user may then set the configuration parameters of the device to be the "standard" for this device type. The administrative user may then setup an email account on the device, may pull the configuration into the product the "standard" configuration, pull user information in from the directory, display the configuration information in a tree-like structure, and may edit selected objects to define the "standard." The configuration may then be saves as a named configuration, which may allow end users to now register like type mobile devices.

In some embodiments, MDM application 103 may provide an editor for the standard set of Nokia™ and Microsoft™ device configuration settings (both Basic and advanced Settings) or other configuration settings. The basic editor may provide human readable values for the settings and offer only valid values for optional settings. In some embodiments, MDM application 103 may provide an advanced editing feature that may provide parameter names and string or integer values.

In some embodiments, MDM application 103 may support management of ALL managed objects on a mobile device 119. In some embodiments, if a mobile device has an OMA DM object, the object may be defined within the device definition. In some embodiments, anytime the mobile device is displayed or selected in the status/configuration information GUI, all the available managed objects may be displayed.

In some embodiments, billing information and other information regarding a mobile device 103 and its associated end user may be provided from a service provider/operator via an administrative interface that may be accessed by the administrative users of MDM application 103. For example, a service desk analyst contacted by an end user regarding an improperly operating mobile device 119 may be able to access logs and other information regarding the mobile device 119 via MDM application 119 to assist with diagnostics and incident resolution.

In some embodiments, MDM application 103 may provide an end-user portal whereby end users of mobile devices 119 may perform certain functions (which may be considered management tasks) such as, for example, registering a mobile device 119 with MDM database 111 (provides for migration of mobile devices 119), changing the end-users' user name and/or password, reset the policies of a mobile device, deactivating a mobile device 119 (in some embodiments, end users may be prevented from deactivating mobile devices), or other functions. In some embodiments, the end-user portal may be accessed via portal 109 or other computer terminal. In some embodiments, the end-user portal may be accessed via an end user's, mobile device 119.

In some embodiments, an end user may be authenticated prior to being granted access to the end user portal. In some embodiments, the authentication may include the end user providing and MDM application 103 verifying a username and/or password. In some embodiments, MDM application may maintain an audit of any management functions initiated by an end user, so that they may be tracked and corrected by administrative users, if necessary.

As described herein, MDM application 103 may enable policy management of mobile devices 119*a*-119*n* via performing one or more management tasks. Policy management may include assurance that mobile devices 119*a*-119*n* are configured and controlled to comply with an enterprise's policies. These policies may define specific configurations for devices to assure compliance with regulations such as Sarbanes-Oxley, various best practices schemes, and/or other guidelines or regulations (whether internally or externally imposed on an enterprise). In order to ensure policy compliance, an enterprise may create and maintain a specific set of policies for various computing environments and enterprise roles of end users within the organization, including those to be applied to mobile devices (e.g., mobile devices 119a-119n). When employees are provisioned mobile devices 119, these mobile devices are configured to adhere to the specific policies for their enterprise role within the organization. MDM application 103 enables these policies or instructions to mobile devices enforcing those policies to be pushed to mobile devices 119a-119n, regardless of the type or platform of the mobile device. Additionally, MDM application 103 may provide "audit reports" or other alerts regarding mobile devices 119 that are in and out of compliance with policies so that out of compliance mobile devices may be brought into compliance.

In some embodiments, a policy may include one or more "configuration sets" and associated with an "end user group." An end user group may include a set of one or more selected users whose associated mobile devices 119 are to receive a policy. In some embodiments, an end user group may include end users who are in the same or similar enterprise roles within the enterprise. In some embodiments, other factors (e.g., geography, type of device, or other criteria) may be used to determine end users in a particular end user group. In some embodiments, an end user group may only be assigned to one policy. In some embodiments, a policy may only contain one configuration set for each specific type of mobile device 119 within an end user group (hence a policy may only have as many configuration sets assigned to it as there are mobile device types in the end user group). In some embodiments, a configuration set may include all of the configuration information for a specific mobile device 119.

Figure 5:
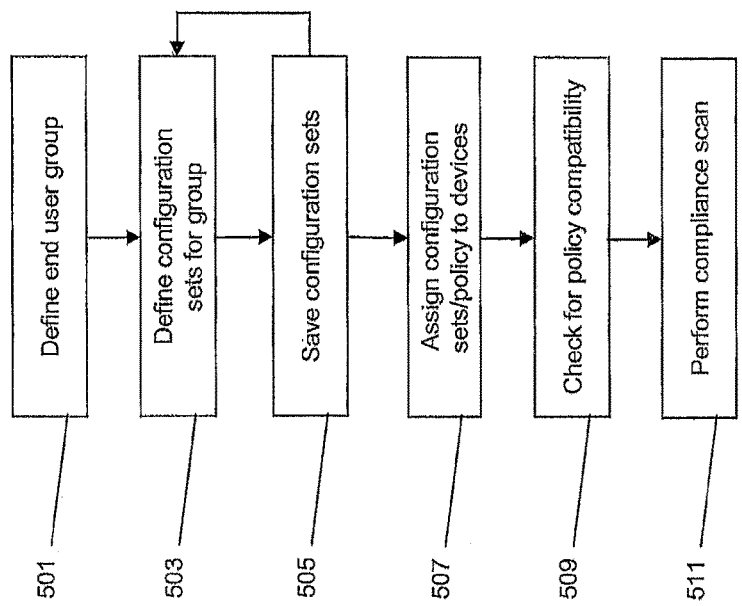
FIG. 5 illustrates a process for applying a policy to an end user group of mobile devices according to various embodiments of the invention.

In some embodiments, management module 123c or other module of MDM application 103 may provide a GUI or other interface whereby an administrative user (e.g., a systems administrator) may create, delete, clone, and/or edit one or more policies, their associated configuration sets, and/or end user groups. FIG. 5 illustrates a process 500, which is an example of a process for defining and assigning a policy to one or more mobile devices 119 using MDM application 103. In some embodiments, process 500 may include an operation 501, wherein an administrative user may define an end user group using the GUI or other interface provided by management module 123c. In some embodiments, the administrative user may define a user group by selecting one or more end users from a list of end users whose mobile devices 119 are registered and bootstrapped within MDM application 103. In some embodiments, the administrative user may define a query that selects end users whose end user devices are registered and bootstrapped within MDM application 103. In some embodiments, MDM application 103 may map enterprise directory groups to end user group or otherwise utilize enterprise role information regarding end users to define an end user group. For example, all end users in an enterprise's finance department may be set to the same policy by virtue of being grouped by MDM application as an end user group. Other methods of defining the end user and/or mobile devices 119 in an end user group may be utilized.

In an operation 503, the administrative user may define a policy (i.e., one or more configuration sets) to apply to the mobile devices 119 associated with the end users in the defined end user group. In some embodiments, management module 123c may enable the administrator to define the policy (i.e., the configuration sets comprising the policy) using one or more configuration set templates. In some embodiments, the configuration set templates may provide fields for all of the necessary configuration information for mobile devices 119a-119n. As such, a configuration set template may provide configuration information so as to configure all supported "managed objects" on specific models or types of mobile devices 119. In some embodiments, configuration sets may include configuration for administrative settings and parameters (which may only be modified by an administrative user) and end user modifiable settings and parameters. In some embodiments, MDM application 103 may support a defined base reference of management objects. This base reference may be supported for a plurality of mobile device platforms (e.g., Blackberry™, Nokia™ Microsoft Mobile™ and/or other platforms). In some embodiments a base reference managed object tree may be defined separately.

In some embodiments the administrative user may utilize the GUI provided by management module 123c to set the values of each managed object (e.g., the template's default settings may be changed, or the template may not provide a default setting). In some embodiments, configuration set templates may be based on a generic data model that is XML based. In some embodiments, management module 123c may provide sample policy templates for low, medium, and high security so that administrative users may have a baseline security model from which to operate at a given level.

In an operation 505, this set of values may then be saved as a named configuration set. If the policy includes multiple configuration sets, process 500 may return to operation 503, where additional configuration sets may be defined.

In an operation 507, the defined configuration set may then be assigned to the defined end user group, which includes the mobile devices 119 associated with the end users in the end user group (in some instances wherein an end user is associated with two or more end user devices, one or more of the end user's additional devices may be excluded from the user group; an administrator may exclude these devices manually, via the GUI or other interface provided by management module 123c). As described herein, in some embodiments, management module 123c may utilize one or more platform servers 113a-n (depending on the types of mobile devices in the end user set) to assign the policy to the mobile devices 119 in the end user group. As described herein, one or more agents of the platform servers 113a-113n may be used to assign the policy to the mobile devices 119 in the end user group. As disclosed herein, policies may be assigned to mobile devices 119 OTA (i.e., wirelessly).

In some embodiments, when assigning the configuration set to the end user group, management module 123 may check that the policy will be "correct" for the mobile devices within the defined user group (will operate on the mobile devices within the user group) in an operation 509. For example, in some embodiments, an administrative user may be prevented from assigning a Nokia device configuration set to a Microsoft Mobile™ based device.

In some embodiments, MDM database 107 may store the present and last policy configuration for each managed mobile device 119. As disclosed herein, the stored configuration for the last policy may be used to be used to "roll back" the configuration of the device in the event of problems with a new policy change.

In some embodiments, management module 123c may enable scans (scheduled or ad-hoc) of mobile devices 119a-119n to determine if devices are configured to be "compliant" with their assigned policies. These scans may occur OTA (i.e., wirelessly), in an operation 511 of process 500, and may utilize one or more agents of platforms servers 113a-113n to enable scans of mobile devices 119 from different platforms. In some embodiments, these compliance scans may essentially challenge mobile devices to report their configuration settings, and compare the reported setting to stored information regarding what the settings should be (e.g., the last policy pushed to the mobile device 119).

In some embodiments, at the completion of each scan job, a report or alert regarding mobile devices 119 that are "out-of-compliance" or "non-contactable" may be provided to an administrative user. In some embodiments, an administrative user may be able to set an option for scans that requires immediate assignment of the proper policy to a mobile device 119 that is deemed out of compliance. In some embodiments, the management module 123c may enable an attribute to be assigned to an end user and/or an end user group such that the end users in the group may be exempt from the above automatic re-instatement of its policy if out-of-compliance. In some embodiments, when exempted devices are scanned and found to be out-of-compliance they may be listed in the above-referenced report as "out of compliance" and "exempt".

In some embodiments, specific policy rules may be implemented by MDM application 103 for mobile devices 119 of a certain platform. For example, in some embodiments, when a Blackberry™ device is registered, a blank policy may be automatically pushed to the device. In some embodiments, a blank policy may be pushed to mobile devices 119 of other platforms when those mobile devices are registered.

In some embodiments, MDM application 103 may enable an administrative user to initiate and direct management functions for groups of one or more mobile devices 119 so as to precisely control the order, timing, infrastructure load, and other parameters of management tasks. As such, management module 123c may enable administrative users (e.g., systems administrators) to submit management tasks to MDM application 103 as scheduled "jobs." MDM application 103 may then contact each mobile device 119 to which a management task applies and initiate the task. The mobile device 119 to which a management task was submitted may complete the task and send back a response so as to inform the administrative user that the task has been completed. In this manner, the administrative user has information regarding the completion of a management task that can be used in scheduling additional management tasks or used for other purposes.

In some embodiments, some mobile devices 119 may not be reachable (e.g., out of range, platform server 113 malfunction, etc.) and/or may have problems with the task. As such the administrative user may be provided with a report regarding the progress of the submitted jobs/management tasks (i.e., which have been completed successfully, percent complete [number of mobile devices 119 on which the task has been completed out of total mobile devices to which task was sent], which have failed, percent failed [number of mobile devices 119 on which the task failed out of total mobile devices to which task was sent], which mobile devices 119 are not contactable, which tasks are "yet to go," or other information).

In some embodiments, when an administrative user selects a group of devices for a management task, the administrative user may schedule when they want the task to be commenced (immediately or at a specific day and time). The management task/job may be assigned a unique job name or other unique identifier by management module 123c.

In some embodiments, management module 123c may provide a GUI or other interface, which may enable administrative users (e.g., a systems administrator) to view a list of scheduled tasks in a job queue (which may be scheduled tasks for all managed mobile devices 119a-119n or a subset thereof, including single mobile devices 119), the progress of each task (which have been completed successfully, percent complete [number of mobile devices 119 on which the task has been completed out of total mobile devices to which task was sent], which have failed, percent failed [number of mobile devices 119 on which the task failed out of total mobile devices to which task was sent], which mobile devices 119 are not contactable, which tasks are "yet to go," or other information), a list of tasks from a preceding time period (e.g., all tasks from the last 3 months, or other time period), or other information. In some embodiments, the administrative user may be able to request that a management task be rerun or "retried" (at a scheduled time) for any management task/job that has been unsuccessfully completed.

In some embodiment, MDM application 103 may enable an administrative user (e.g., a systems administrator) to control the management tasks in the job queue of MDM application 103. In some embodiments, the administrative user may view the contents of the queue (e.g., the tasks/jobs in the queue), delete an individual task/job in the queue, flush the queue of jobs (e.g., cancel all tasks/jobs in the queue), or perform other functions related to the job/task queue.

In some embodiments, an enterprise may utilize other information technology (IT) applications. As described above, the enterprise also utilizes enterprise directory 111 for authentication and authorization to its network. As any additional application (e.g., MDM application 103) should comply with existing enterprise policies and use the existing Authentication/Authorization/Audit framework in place for the existing IT applications, MDM application may use enterprise directory 111 for its authentication and authorization. In some embodiments, MDM application 103 may utilize or cooperate with additional information technology security applications such as, for example, eTrust™ IAM Toolkit from CA™, which may provide the basis for the security framework of MDM application 103 (e.g., to provide security authentication/authorization/audit features). In some embodiments, the additional IT security applications may provide security-related audit logs associated with security that may be sent to still other IT management applications.

In some embodiments, end users and administrative users access (e.g., via portal 109, end user portals, or other access points) to MDM application 103 may be password protected. In some embodiment, end users and/or administrative users may change their password with the aid of a systems administrator. In some embodiments, one or more rules may define the parameters for passwords used for access to MDM application 103 such as, for example, rules defining the length of a password, rules requiring for numbers in a password, rules requiring special characters in a password, password aging, a number of consecutive failed log-ons before user disabled, hints for password syntax for user on password selection, and/or other rules.

In some embodiments, additional access security functions may be used with MDM application 103 such as, for example, logging the time and/or date when a user logged in last.

In some embodiments, access control module 123a or other module of MDM application 103 may enable the one or more security/access functions described herein (including password rules and user id/password mediated access control). For example, in some embodiments, an administrative user (e.g., a service desk analyst) may only be able to view and interact with mobile device and user objects of specific groups of end users. This mechanism enables the operating enterprise to partition the user population into specific geographies or other organizational units and only allow specific service desk analysis access to the specified partitioned populations.

MDM application 103 may support both small and large enterprises. In some instances, large enterprises may be widely distributed geographically and may utilize local administrative users dealing with subsets of end users. As such, MDM application 103 may be configured such that the management of devices can be decentralized to local centers and administrative users operating at those centers may only be able to manage local mobile devices 119.

In some embodiments, access control module 123a may utilize a separate IT security application (e.g. eTrust™ IAM Toolkit) and the access control definitions dictating access partition of data may be compatible with the separate IT security application (for example, the separate IT security application may enable access control definitions to be defined by a node in enterprise directory 111, where the service desk analysts may only be able to view and operate on end user information of users below the specified directory node; e.g., a certain service desk analyst may only operate on end users in Canada).

In some embodiments, access control module 123a may provide a GUI or other interface as configuration tools to nominate a partition of data service desk analysts.

In some embodiments, MDM application 103 may be available on a 24×7 basis for support/management of mobile devices 119a-119n. In some embodiments, MDM application 103 may require an offline maintenance slot of not more than an hour each month or 99.9% availability. When not off-line for maintenance, MDM application 103 may be able to initiate all management functions. As such, MDM application 103 may support database replication features, standby server components, or other features for ensuring availability.

In some embodiments, MDM application 103 may include and/or support a script or process that may be run via command line or other interface (e.g., a GUI) or otherwise be scheduled to run to backup all databases and any configuration files needed in the event that MDM application 103/system 101 needs to be restored. In some embodiments, MDM application 103 may include or support a script or process that may enable an administrative user (e.g., a systems administrator) to restore a backup file to rebuild or restore an element of system 101 to a known state.

In some embodiments, MDM application 103 may include one or more utilities or modules enabling administrative users to manage the files on an OTA content server 125, or other content server used with the systems and methods of the invention.

In some embodiments, MDM application 103 may include a mechanism so that the enterprise may update MDM application 103 by uploading new device definitions or other files. In some embodiments, the code (e.g., object code or source code) of MDM application 103 or one or more modules 123a-123n may be updated and/or patched using patch and update procedures.

In some embodiments, MDM application 103 may be scalable whereby multiple MDM servers 105 may be utilized (as disclosed herein) to improve OTA management performance. In some embodiment, system 101 (e.g., MDM application 103, MDM server 105, MDM database 107, and/or other elements) may include a distributed architecture such that elements/components may be moved to specific hardware platforms for administration and performance reasons. In some embodiments wherein multiple MDM databases 107 are utilized in a distributed fashion, local MDM databases 107 may only manage mobile devices 119 that are defined as local (e.g., by a query to enterprise directory 111 or otherwise defined as local), which would define the scope of "discovery" and enterprise directory 111 updates.

As disclosed herein, MDM application 103 may support multiple MDM servers 105 so that the management load can be distributed, if necessary. In some embodiments, a load sharing algorithm may be used, and, in some embodiments, may be based on the length of the work queues for each MDM server 105. In some embodiments, each MDM server 105 may be able to run 100 concurrent sessions resulting in completing a predefined number of transactions of a predefined type over an hour (in some embodiments, the predefined number and transaction types may depend on the enterprise size, needs, and/or other factors). In some embodiments, all device or client initiated sessions may be included in this count. As used herein, a transaction may include a discrete connection between one mobile device 119 and an MDM server 105. In some embodiments, a set of design guidelines may be written to assist administrative users to scale the product geographically and by adding additional MDM servers 105.

In some embodiments, MDM application 103 may include a monitoring module 123d, which may monitor connections at an application level between the various components of system 101 and other elements of environment 100. In some embodiments, the monitored connections may include connections between MDM application 103 and: MDM servers 105, OTA content servers 125, MDM database 107, platform servers 113a-113n, enterprise directory 111, portal 109, or other portions of the IT infrastructure of the enterprise. In the event of an error or timeout, MDM application 103 may generate an alert which may be sent to an administrative user (e.g., a service desk analyst) and/or other components of the enterprise's IT infrastructure.

As disclosed herein, in some embodiments, MDM application 103 may generate alerts of different types such as, for example, alerts related to the health of MDM servers 105, platform servers 113a-113n, or the health or problematic status of other elements utilized by the invention. For example, in some embodiments, if a crucial server or other element is subject to a number of unsuccessful logons that exceeds a predetermined threshold, an alert may be sent to one or more administrative users. In another example, if the status monitoring mentioned herein indicates that the connection between one or more elements used in the invention is lost, then an alert may be sent to one or more administrative users. In some embodiments, these alerts or other alerts or reports disclosed herein may be provided to one or more administrative users via email, via a GUI or other interface supported by MDM application, or via other methods. For example, in some embodiments, a GUI may provide an indication of new alerts.

In some embodiments, an administrative user (e.g., a systems administrator) may have access to configuration files for MDM application 103 so as to maintain the operational status of system 101. In some embodiments, this maintenance may include starting/stopping/rebooting MDM servers 105, viewing system/audit/transaction logs/reports, configuring external event logging (with eSCC, UEC, etc.), configuring plugin connections, configuring enterprise directory 111 connections, configuring licensing with IT infrastructure applications, or other maintenance.

In some embodiments, MDM application may provide support for multiple language versions (double byte, Unicode, etc).

In some embodiments, MDM application 103 may enable administrative users to define the features mobile devices 119*a*-119*n*. Administrative users may further setup a mobile device tree and define each leave of the tree. In some embodiments, each mobile device manufacturer may utilize their own proprietary management objects on the device tree (e.g., as in SNMP each device manufacturer has their own MIB). MDM application 103 may enable administrative users to define a definitions file to extend management capability. For example, when Nokia releases a new series of mobile devices that have extended management capability offered through a device management client, an administrative user may write a definitions files for the extended management capability without having to ship a service pack for MDM server 105. In some embodiments, these definitions may be able to be downloaded from a provider (e.g., a vendor of MDM application 103) or otherwise acquired to install in MDM application 103. Once installed, the new mobile devices will be supported by MDM application 103. In some embodiments, a list of supported mobile devices may be maintained in an XML file or file of another format. In some embodiments, an administrative user may be able to edit this file to indicate only those devices used by an enterprise. In some embodiments, templates for bootstrapping files or configuration sets for newly supported files may be downloaded from a provider or otherwise acquired or created.

In some embodiments, monitoring module 123*d* or other module of MDM application 103 may enable audits of operational tasks of MDM application 103, so as to diagnose performance and security issues. As such, monitoring module 123*d* may provide an audit log of all operations of MDM application 103 for analysis and diagnosis. The audit log may define all operations of users (administrative users and end users) of MDM application 103. In some embodiments, the audit log may include a date, time, user, function, function parameters of each operation, or other information. In some embodiments, monitoring module 123*d* may provide a GUI or other interface to enable administrative users to view and sort the log file by date, time, user, function, or other criteria. The resultant filtered log file may be provided to administrative users as a report. In some embodiments, the audit logs may include information regarding OTA management tasks or other management tasks. In some embodiments, an administrative user may be able to define the size and number of the log files. In some embodiments, monitoring module 123*d* may generate an alert to one or more administrative users when audit logs are 80% full (or other predetermined amount full). In some embodiments, an administrative user may define a strategy in the event of a full audit file such as, for example, sending an alert that all auditing has terminated (which may otherwise not affect MDM application 103 performance), continuing auditing by overwriting the oldest audit log, or other strategy.

As disclosed herein, one or more GUIs or other interfaces may be provided/supported by MDM application 103 and its component modules 123*a*-123*n*.

In some embodiments, as disclosed herein, MDM application 103 may provide/support one or more reports such as, for example, reports regarding end-users and/or mobile devices 119 which have no associated policy, are not registered, or are not bootstrapped; reports regarding policy deviations for a given time period (e.g., total % out of compliance, top 10 reasons that devices are out of compliance by percentage—e.g., "the largest reason at 56% that devices are out of compliance is "Bluetooth Enabled", followed by "unregistered software" at 23%, etc."); reports regarding new policies defined since a certain date; reports regarding policy association changes since a certain date; reports regarding policies having a particular configuration (e.g., showing all policies with Bluetooth™ enabled mobile devices 119); an executive monthly summary, that may include, for example, total devices under management (which may be sorted or filtered by end-user roles or departments, mobile device types, service providers/operators or otherwise sorted or filtered), % of devices within compliance, % of devices out of compliance (which may be sorted or filtered by end-user roles or departments, mobile device types, service providers/operators or otherwise sorted or filtered), total number of devices added in a time period (which may be sorted or filtered by end-user roles or departments, mobile device types, service providers/operators or otherwise sorted or filtered), total number of devices retired in a time period (which may be sorted or filtered by end-user roles or departments, mobile device types, service providers/operators or otherwise sorted or filtered); and/or other reports.

In some embodiments, management module 123*c* or other module of MDM application 103 may enable licensing management of product, software, or other licenses related to mobile devices 119*a*-119*n*. In some embodiments, management module 123*c* may enable tracking of the number of mobile devices 119 that licensed from a particular licensor (this quantity may then be compared to the number of registered mobile devices 119 in MDM database 107 to check for compliance with the license). In some embodiments, management module 123*c* may provide administrative users with a GUI or other interface that defines a present maximum number of mobile devices allowed by a certain license and a present total number of registered mobile devices applicable to the license. The administrative user may then be able to change the license parameters using this GUI using a new license key. In some embodiments, MDM server 105 may operate on any size processor and a key that identify the largest tier will be used to generate license keys.

In some embodiments, monitoring module 123*d* or other module of MDM application 103 may perform a scan of any data stores or tracking systems utilized by platform servers 113 to track their respectively supported mobile devices 119 (e.g. a scan of a BES™ database to track Blackberry™ mobile devices 119). In this manner, MDM application may maintain an inventory and status of all devices using the tracking and storage systems of the individual platform servers 113, thus removing the need to manually interact with the mobile devices 119 themselves, which further provides operability with a plurality of mobile device platforms. In some embodiments, this scan may be performed on a predetermined interval (e.g., daily or other interval) or in an ad-hoc-manner. In some embodiments, a report of the changes each from the previous scan may be provided to an administrative user. The scan may include an inventory of each mobile device 119 for a certain platform including: a device end user; the end-user's enterprise role and/or department; a phone number associated with the mobile device; a mobile device type; a service provider/operator associated with the mobile device; an IMEI or other identification number associated with a mobile device; a identifier or description of the policy or configuration set applied to a mobile device; a platform server 113, mail server, and/or other server associated with a mobile device; any platform specific agents used with a mobile device, and any version information (e.g., operating system or other software version information) associated with a mobile device.

In some embodiments, monitoring module 123d or other module of MDM application 103 may generate device status alerts for each mobile device such as, for example, loss of connectivity, email timeout, policy timeout, last contact time, or other status.

In some embodiments, a web services module 123e or other module of MDM application may provide web services to one or more platform servers 113a-113n, so as to enable web services and web-based interaction between platform servers 113a-113n and MDM application 103. In some embodiments, web services module 123e may be loaded on and/or run on platform servers 113a-113n. In some embodiments, web services module 123e may provide a GUI or other interface enabling administrative users (e.g., a systems administrator) to define a web services connection between platform servers 113 and MDM application 103. The GUI or other interface may also be able to provide status information regarding one or more platform servers 113a-113n.

In some embodiments, wherein mobile devices 119 support email functionality, an administrative user may be able to automatically test end-to-end email connectivity of mobile devices via a "Email ping" function provided by MDM application 103 that includes a crafted test email. The email ping function may provide help messages to assist the administrative user in diagnosing the results of the ping. The email ping function may use a "<confirm>" option in the email message to receive a returned email to confirm delivery at a mobile device.

In some embodiments, monitoring module 123d or other module of MDM application 103 may detect inactivity of mobile devices over some specified time. This function enables immediate deactivation of mobile devices or work flow processes that enable administrative users to choose to deactivate individual mobile devices 119.

In an embodiment, there is provided a system for managing a plurality of mobile devices of an organization via a common interface, the system comprising: a registration module that receives an identifier for each of the plurality of mobile devices, wherein the identifier indicates a platform supporting each of the plurality of mobile devices; and a management module that receives a management task definition for a management task to be performed on at least two of the plurality of mobile devices and determines, using identifiers from the at least two mobile devices, a first platform supporting at least a first of the at least two mobile devices and a second platform supporting at least a second of the at least two mobile devices, wherein the management module provides instructions to one or more modules specific to the first platform for performing the management task on at least the first device and provides instructions to one or more modules specific to the second platform to perform the management task on at least the second device, and wherein the one or more modules specific to the first platform perform the management task on at least the first device using, at least in part, wireless communication with at least the first device, and the one or more modules specific to the second platform perform the management task on at least the second device using, at least in part, wireless communication with at least the second device.

In an embodiment, the registration module receives end user information regarding at least one end user for one or more of the at least two mobile devices, wherein the end user information includes enterprise role information regarding the at least one end user's association with the organization and wherein the management task definition is based at least in part on the enterprise role information. In an embodiment, the registration module receives the end user information from an enterprise directory associated with the organization. In an embodiment, the management task includes applying a policy to the at least two mobile devices, the policy including one or more configuration sets specifying configuration information for the at least two mobile devices. In an embodiment, the number of configuration sets in the policy equals the number of different platforms supporting one or more of the at least two mobile devices. In an embodiment, the management task includes retrieving status information from the at least two mobile devices. In an embodiment, the status information includes at least a logical state of each of the at least two mobile devices, the logical state including an indication of the use of each of the at least two mobile devices as an asset within the organization. In an embodiment, the management module receives a response to the instructions to perform the management task from the one or more modules specific to the first platform and the one or more modules specific to the second platform, the response indicating a status of the management task. In an embodiment, the status of the management task includes an indication that the management task has been successfully performed, the management task has not been successfully performed, or device not reachable.

In an embodiment, there is provided a method for managing a plurality of mobile devices of an organization via a common interface, the method comprising: receiving an identifier for each of the plurality of mobile devices, wherein the identifier indicates a platform supporting each of the plurality of mobile devices; receiving a management task definition for a management task to be performed on at least two of the plurality of mobile devices; determining, using identifiers from the at least two mobile devices, a first platform supporting at least a first of the at least two mobile devices and a second platform supporting at least a second of the at least two mobile devices; providing instructions to one or more modules specific to the first platform for performing the management task on at least the first device; and providing instructions to one or more modules specific to the second platform to perform the management task on at least the second device, and wherein the one or more modules specific to the first platform perform the management task on at least the first device using, at least in part, wireless communication with at least the first device, and the one or more modules specific to the second platform perform the management task on at least the second device using, at least in part, wireless communication with at least the second device.

In an embodiment, the method further comprises receiving end user information regarding at least one end user for one or more of the at least two mobile devices, wherein the end user information includes enterprise role information regarding the at least one end user's association with the organization and wherein the management task definition is based at least in part on the enterprise role information. In an embodiment, the registration module receives the end user information from an enterprise directory associated with the organization. In an embodiment, the management task includes applying a policy to the at least two mobile devices, the policy including one or more configuration sets specifying configuration information for the at least two mobile devices. In an embodiment, the number of configuration sets in the policy equals the number of different platforms supporting one or more of the at least two mobile devices. In an embodiment, the management task includes retrieving status information from the at least two mobile devices. In an embodiment, the status information includes at least a logical state of each of the at least two mobile devices, the logical state including an indication of the use of each of the at least two mobile devices as an asset within the organization. In an embodiment, the method further comprises receiving a response to the instructions to perform the management task from the one or more modules specific to the first platform and the one or more modules specific to the second platform, the response indicating a status of the management task. In an embodiment, the status of the management task includes an indication that the management task has been successfully performed, the management task has not been successfully performed, or device not reachable.

In an embodiment, there is provided a system for managing a plurality of mobile devices of an organization via a common interface, comprising: a registration module that receives location information regarding end user information within an enterprise directory and retrieves end user information regarding at least one of a plurality of end users from the enterprise directory using the location information, wherein the retrieved end user information includes information relating to one or more mobile devices of the plurality of mobile devices associated with the at least one end user and enterprise role information regarding the at least one end user's association with the organization; and a management module that determines a management task definition for a management task to be performed on the one or more mobile devices, at least in part using the enterprise role information, and provides instructions to the one or more mobile devices for performing the management task using, at least in part, wireless communication.

In an embodiment, the location information includes a path name for the enterprise directory. In an embodiment, the enterprise role information includes information that is used to determine the at least one end user's data permissions within the organization. In an embodiment, employees of the organization are associated with one or more departments of the organization and wherein enterprise role information includes information regarding one or more departments associated with the at least one end user. In an embodiment, the management task includes applying a policy to the one or more mobile devices, the policy including one or more configuration sets specifying configuration information for the at least two mobile devices. In an embodiment, the management module provides instructions to one or more modules specific to a platform of each of the one or more mobile devices, wherein the one or more modules specific to the platform perform the management task on the one or more mobile devices using, at least in part, wireless communication.

In an embodiment, there is provided a method for managing a plurality of mobile devices of an organization via a common interface, comprising: receiving location information regarding end user information within an enterprise directory; retrieving end user information regarding at least one of a plurality of end users from the enterprise directory using the location information, wherein the retrieved end user information includes information relating to one or more mobile devices of the plurality of mobile devices associated with the at least one end user and enterprise role information regarding the at least one end user's association with the organization; determining a management task definition for a management task to be performed on the one or more mobile devices, at least in part using the enterprise role information; and providing instructions to the one or more mobile devices for performing the management task using, at least in part, wireless communication.

In an embodiment, the location information includes a path name for the enterprise directory. In an embodiment, the enterprise role information includes information that is used to determine the at least one end user's data permissions within the organization. In an embodiment, employees of the organization are associated with one or more departments of the organization and wherein enterprise role information includes information regarding one or more departments associated with the at least one end user. In an embodiment, the management task includes applying a policy to the one or more mobile devices, the policy including one or more configuration sets specifying configuration information for the at least two mobile devices. In an embodiment, the method further comprises providing instructions to one or more modules specific to a platform of each of the one or more mobile devices, wherein the one or more modules specific to the platform perform the management task on the one or more mobile devices using, at least in part, wireless communication.

While the operations of the methods or processes described herein may have been provided in a certain order, orders of operations may be used within the scope of the invention. Furthermore, in some embodiments, more or less of the provided operations may be used within the scope of the invention.

In some embodiments, the invention may provide a computer readable medium having computer readable instructions thereon, for instructing one or more processors to perform some or all of the process, operations or other features and functions described herein.

While particular embodiments of the invention have been described, it is to be understood that modifications will be apparent to those skilled in the art without departing from the spirit of the invention. The scope of the invention is not limited to the specific embodiments described herein. Other embodiments, uses and advantages of the invention will be apparent to those skilled in art from the specification and practice of the invention disclosed herein.

What is claimed is:

1. A system to manage a plurality of mobile devices of an organization via a common interface, the system comprising:
   a registration module configured to receive an identifier for each of the plurality of mobile devices, wherein each identifier enables identification of a platform operating on its respective mobile device from the plurality of mobile devices and receive, for at least two of the plurality of mobile devices, end user information regarding one or more end users, wherein at least the end user information is obtained from an enterprise directory of the organization, wherein the registration module is authenticated and authorized by an application to the enterprise directory and wherein the end user information from the enterprise directory comprises access control and/or permissions data; and
   a management module configured to determine a management task definition for a management task to be performed on at least two of the mobile devices, based at least in part on the end user information, and determine, using the received identifiers from the at least two mobile devices, a first platform operating on at least a first of the at least two mobile devices and a second platform operating on at least a second of the at least two mobile devices, wherein a first platform server formulates instructions, specific to the first platform, to perform the management task on the at least first device, and wherein a second platform server formulates instructions, specific to the second platform, to perform the management task on the at least second device.

2. The system of claim 1, wherein the registration module is configured to receive, from a user, location information regarding the end user information within the enterprise directory, wherein the location information comprises a path name for the enterprise directory.

3. The system of claim 1, wherein the end user information comprises information that is used to determine the end user's data permissions within the organization.

4. The system of claim 1, wherein employees of the organization are associated with one or more departments of the organization and wherein end user information comprises information regarding one or more departments associated with the end user.

5. The system of claim 1, wherein the management task comprises applying a policy to one or more of the mobile devices, the policy comprising one or more configuration sets specifying configuration information for the one or more mobile devices.

6. The system of claim 1, wherein the management task comprises retrieving status information from one or more of the mobile devices, the status information including at least a logical state of each of the one or more mobile devices, the logical state including an indication of the use of each of the one or more mobile devices as an asset within the organization, wherein assets within the organization are tracked by an asset inventory application.

7. The system of claim 1, wherein the management task definition is based on authentication or authorization information stored in the enterprise directory.

8. The method of claim 1, wherein the end user information comprises enterprise role information regarding an end user's association with the organization.

9. The method of claim 1, wherein the end user information comprises information relating to one or more mobile devices of the plurality of mobile devices associated with the end user.

10. A method to manage a plurality of mobile devices of an organization via a common interface, the method comprising:

receiving an identifier for each of the plurality of mobile devices, wherein each identifier enables identification of a platform operating on its respective mobile device from the plurality of mobile devices;

retrieving, for at least two of the plurality of mobile devices and using a registration module, end user information regarding one or more end users, wherein at least the end user information is obtained from an enterprise directory of the organization, wherein the registration module is authenticated and authorized by an application to the enterprise directory and wherein the end user information from the enterprise directory comprises access control and/or permissions data;

determining a management task definition for a management task to be performed on at least two of the mobile devices, based at least in part on the end user information;

determining, using the received identifiers from the at least two mobile devices, a first platform operating on at least a first of the at least two mobile devices and a second platform operating on at least a second of the at least two mobile devices;

causing a first platform server to formulate instructions, specific to the first platform, to perform the management task on the at least first device; and causing a second platform server to formulate instructions, specific to the second platform, to perform the management task on the at least second device.

11. The method of claim 10, further comprising receiving, from a user, location information regarding the end user information within the enterprise directory, wherein the location information comprises a path name for the enterprise directory.

12. The method of claim 10, wherein the end user information comprises information that is used to determine the end user's data permissions within the organization.

13. The method of claim 10, wherein employees of the organization are associated with one or more departments of the organization and wherein end user information comprises information regarding one or more departments associated with the end user.

14. The method of claim 10, wherein the management task comprises applying a policy to one or more of the mobile devices, the policy comprising one or more configuration sets specifying configuration information for the one or more mobile devices.

15. The method of claim 10, wherein the management task comprises retrieving status information from one or more of the mobile devices, the status information including at least a logical state of each of the one or more mobile devices, the logical state including an indication of the use of each of the one or more mobile devices as an asset within the organization, wherein assets within the organization are tracked by an asset inventory application.

16. The method of claim 10, wherein the management task definition is based on authentication or authorization information stored in the enterprise directory.

17. The method of claim 10, wherein the end user information comprises enterprise role information regarding an end user's association with the organization.

18. The method of claim 10, wherein the end user information comprises information relating to one or more mobile devices of the plurality of mobile devices associated with the end user.

19. A non-transitory computer-readable medium having computer-executable instructions thereon to manage a plurality of mobile devices of an organization via a common interface, the instructions, when executed by a processing device, causing the processing device to perform a plurality of operations comprising:

receiving an identifier for each of the plurality of mobile devices, wherein each identifier enables identification of a platform operating on its respective mobile device from the plurality of mobile devices;

retrieving, for at least two of the plurality of mobile devices and using a registration module, end user information regarding one or more end users, wherein at least the end user information is obtained from an enterprise directory of the organization, wherein the registration module is authenticated and authorized by an application to the enterprise directory and wherein the end user information from the enterprise directory comprises access control and/or permissions data;

determining a management task definition for a management task to be performed on at least two of the mobile devices, based at least in part on the end user information;

determining, using the received identifiers from the at least two mobile devices, a first platform operating on at least a first of the at least two mobile devices and a second platform operating on at least a second of the at least two mobile devices;

causing a first platform server to formulate instructions, specific to the first platform, to perform the management task on the at least first device; and causing a second platform server to formulate instructions, specific to the second platform, to perform the management task on the at least second device.

* * * * *